United States Patent
Yanagawa et al.

(10) Patent No.: US 7,154,831 B2
(45) Date of Patent: Dec. 26, 2006

(54) DEVICE AND METHOD FOR CONTROLLING TILT SERVO

(75) Inventors: Naoharu Yanagawa, Tokorozawa (JP); Masahiro Kato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/174,478

(22) Filed: Jul. 6, 2005

(65) Prior Publication Data

US 2005/0270924 A1    Dec. 8, 2005

Related U.S. Application Data

(63) Continuation of application No. 09/994,608, filed on Nov. 28, 2001, now Pat. No. 6,975,574.

(30) Foreign Application Priority Data

Dec. 1, 2000   (JP) ............................. 2000-367305

(51) Int. Cl.
   *G11B 7/00*   (2006.01)

(52) U.S. Cl. ............................. 369/53.19; 369/44.32; 369/44.37; 369/53.2; 369/52.37

(58) Field of Classification Search ............ 369/53.19, 369/53.2, 53.37, 44.27, 44.29, 44.32, 44.37, 369/44.41
   See application file for complete search history.

(56) References Cited

U.S. PATENT DOCUMENTS 5,056,075 A * 10/1991 Maruta et al. ............ 369/53.19

| | | | |
|---|---|---|---|
| 5,539,710 A | 7/1996 | Tokushuku et al. | |
| 5,742,575 A | 4/1998 | Yamakawa et al. | |
| 6,021,102 A | 2/2000 | Seto et al. | |
| 6,088,317 A | 7/2000 | Kim et al. | |
| 6,122,237 A | 9/2000 | Ohmori et al. | |
| 6,137,754 A | 10/2000 | Furukawa et al. | |
| 6,141,304 A | 10/2000 | Ogasawara et al. | |
| 6,611,482 B1 * | 8/2003 | Ma et al. ................. | 369/53.19 |
| 6,975,574 B1 * | 12/2005 | Yanagawa et al. ....... | 369/53.19 |

FOREIGN PATENT DOCUMENTS

| EP | 0 806 767 A1 | 11/1997 |
|---|---|---|
| EP | 0 874 356 A2 | 10/1998 |
| EP | 0 987 704 A1 | 3/2000 |
| JP | 61 129750 A | 6/1986 |

* cited by examiner

Primary Examiner—Thang V Tran
(74) Attorney, Agent, or Firm—Sughrue Mion, PLLC

(57) ABSTRACT

A tilt servo control device of an apparatus for recording information on and reproducing information from an optical recording medium set in the apparatus, the apparatus comprising an optical system for leading a laser beam emitted from a light source to a recording surface of the optical recording medium and a laser beam reflected by the recording surface of the recording medium to a photo detector and a read signal generator for generating a read signal in accordance with an output signal of the photo detector. The tilt servo control device determines a type of the optical recording medium, generates a tilt drive signal so as to reduce a tilt angle at a position of the laser beam irradiating the recording surface and an optical axis of the laser beam by a method for generating a tilt drive signal corresponding to the recording medium type, and drives a tilt angle adjuster for adjusting the tilt angle in accordance with the tilt drive signal.

5 Claims, 20 Drawing Sheets

DEVICE AND METHOD FOR CONTROLLING TILT SERVO

This is a continuation of application Ser. No. 09/994,608 filed Nov. 28, 2001 now U.S. Pat. No. 6,975,574.

BACKGROUND OF THE INVENTION

1. Field of the Invention

The present invention relates to a tilt servo control device and a tilt servo control method for compensating the tilt angle of a recording surface of an optical recording medium as defined by the angle between the normal to the recording surface of the recording medium and the optical axis of a light beam irradiating the recording surface.

2. Description of the Related Background Art

In order to correctly read information recorded on an optical disk such as a DVD (Digital Versatile Disk), it is necessary to irradiate a reading light beam perpendicularly relative to a recording surface of the optical disk. If the optical disk has a warp, or errors in the mechanical system are large, it is impossible to irradiate the reading light beam perpendicular to the recording surface of the optical disk, thereby deteriorating reading accuracy for the recorded information.

In view of this problem, information reproducing apparatus for reproducing information recorded on an optical disk are normally provided with a tilt servo control device for detecting the tilt between a pickup as information reading means of the apparatus and the optical disk and compensate the tilt by adjusting the direction of the pickup in accordance with the detected tilt or by providing a signal read out by the pickup with a tilt correcting process corresponding to the detected tilt, so as to suppress the deterioration in the information reading accuracy.

Further, in order to compensate the tilt, a tilt servo control device provided with a liquid crystal panel inserted into the optical axis is known (For example, Japanese Patent Laid-Open Publication No. Hei. 11-3531). In the case of the device, the liquid crystal panel is divided into a plurality of regions, and a phase difference is provided to a light beam passing through each of the regions of the liquid crystal panel so as to maximize the level of a signal (RF signal) read out from a recording medium by a pickup.

In optical disks, not only read only optical disks such as a CD-ROM and a DVD-ROM but also writable type optical disks such as a DVD-R, a DVD-RW and a DVD-RAM are included. It is desired that a single optical recording/playing apparatus can correspond to optical disks of any types for the purpose of recording and/or reproducing information. Therefore, it is necessary to mount a tilt servo control device that can properly perform tilt servo control for optical recording media of various different types in the optical recording/playing apparatus.

SUMMARY OF THE INVENTION

It is therefore an object of the present invention is to provide a tilt servo control device and a tilt servo control method that can properly perform tilt servo control for optical recording media of various different types.

The present invention provides a tilt servo control device of an information recording/reproducing apparatus for recording information on and reproducing information from an optical recording medium set into the apparatus, the apparatus comprising an optical system for leading a laser beam emitted from a light source to a recording surface of the optical recording medium and a laser beam reflected by the recording surface of the recording medium to a photo detector and a read signal generator for generating a read signal in accordance with an output signal of the photo detector. The device comprises a recording medium type determining device for determining a type of the optical recording medium, a tilt drive signal generator for generating a tilt drive signal so as to reduce a tilt angle between a normal to the recording surface of the optical recording medium at a position of the laser beam irradiating the recording surface and an optical axis of the laser beam by a method for generating a tilt drive signal corresponding to the type determined by the recording medium type determining device, a tilt angle adjuster for adjusting the tilt angle, and a driver for driving the tilt angle adjuster in accordance with the tilt drive signal.

The present invention provides a tilt servo control method of an information recording/reproducing apparatus for recording information on and reproducing information from an optical recording medium set into the apparatus, the apparatus comprising an optical system for leading a laser beam emitted from a light source to a recording surface of the optical recording medium and a laser beam reflected by the recording surface of the recording medium to a photo detector and a read signal generator for generating a read signal in accordance with an output signal of the photo detector. The method comprises the steps of determining a type of the optical recording medium, generating a tilt drive signal so as to reduce a tilt angle between a normal to the recording surface of the optical recording medium at a position of the laser beam irradiating the recording surface and an optical axis of the laser beam by a method for generating a tilt drive signal corresponding to the recording medium type, and driving a tilt angle adjuster for adjusting the tilt angle in accordance with the tilt drive signal.

DETAILED DESCRIPTION OF THE PREFERRED EMBODIMENTS

Embodiments of the present invention will now be described in detail hereinafter with reference to the accompanying drawings.

Figure 1:
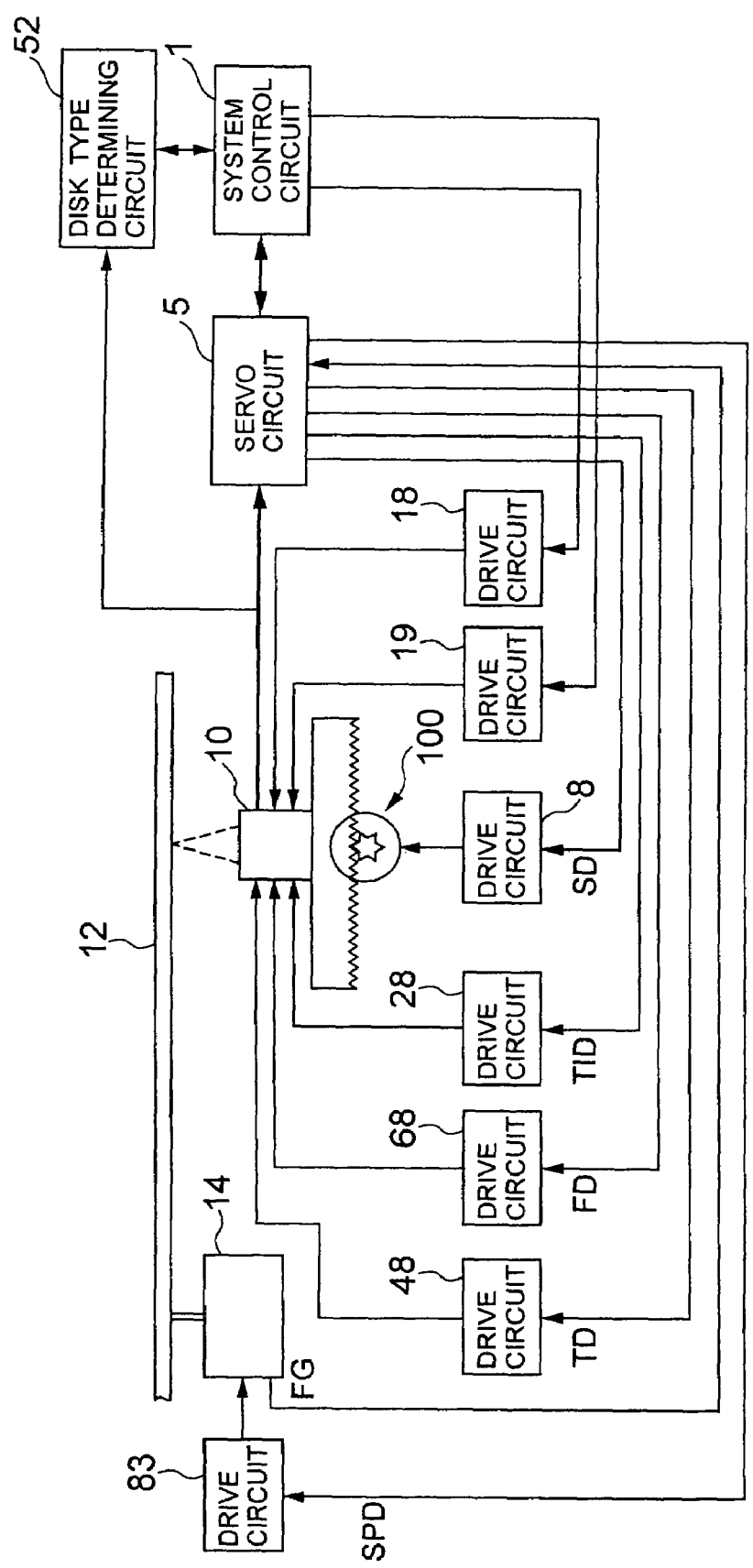
FIG. 1 is a block diagram of a disk player provided with a tilt servo control device according to the present invention.

FIG. 1 is a schematic block diagram of an optical disk player provided with a tilt servo control device according to the present invention. In the illustrated optical disk player, a pickup 10 irradiates a laser beam onto an optical disk 12 and receives a laser beam reflected by the optical disk 12. Then, the pickup 10 generates a signal corresponding to the intensity of the received laser beam. The optical disk 12 is driven to rotate by a motor 14. The optical disk 12 may be a DVD type disk such as a DVD-ROM, a DVD-R, a DVD-RAM and a DVD-RW or a CD type disk such as a CD-ROM and a CD-R. The DVD-RAM has two types, a one-recording-layer disk and a two-recording-layer disk.

Figure 2:
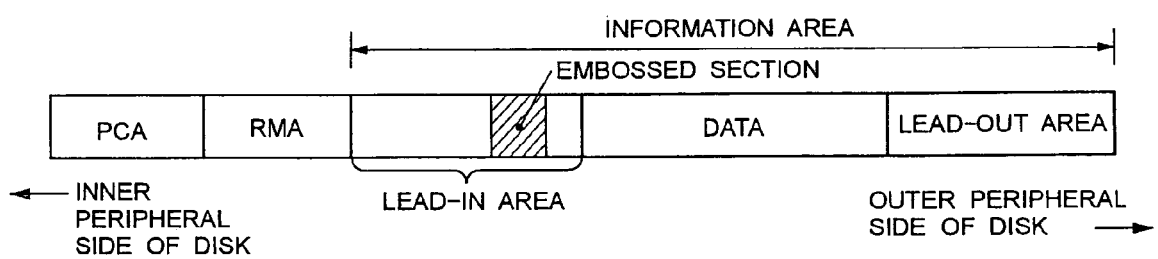
FIG. 2 is a schematic diagram illustrating the recording format of a DVD-RW.

Referring to FIG. 2, a DVD-RW has data structure including a PCA (power calibration area), an RMA (recording management area), a lead-in area, a data area and a lead-out area arranged in the mentioned order from the inner periphery to the outer periphery of the disk. The PCA is an area to be used for a test writing operation so as to determine a recording power level of the laser beam and the RMA is an area where management information on the current recording operation is written. The lead-in area contains an embossed section comprising phase pits formed on the disk in advance. The embossed section stores information on prohibition of copying.

Figure 3:
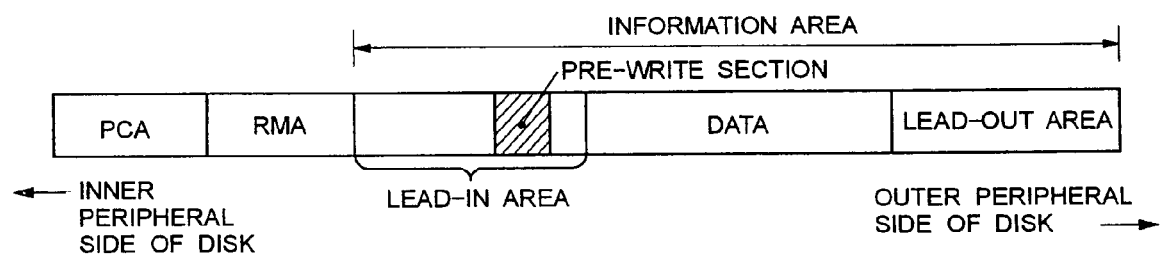
FIG. 3 is a schematic diagram illustrating the recording format of a general purpose DVD-R.

A DVD-R may be a general purpose disk or an authoring purpose disk. Referring to FIG. 3, a general purpose DVD-R has a data structure including a PCA, an RMA, a lead-in area, a data area and a lead-out area arranged in the mentioned order from the inner periphery to the outer periphery of the disk. The lead-in area contains in part thereof a pre-write section that is located at a position exactly corresponding to that of the embossed section and used to store information just like the embossed section. On the other hand, an authoring purpose DVD-R does not have any section that corresponds to the embossed section in FIG. 2 or the pre-write section in FIG. 3.

Figure 4:
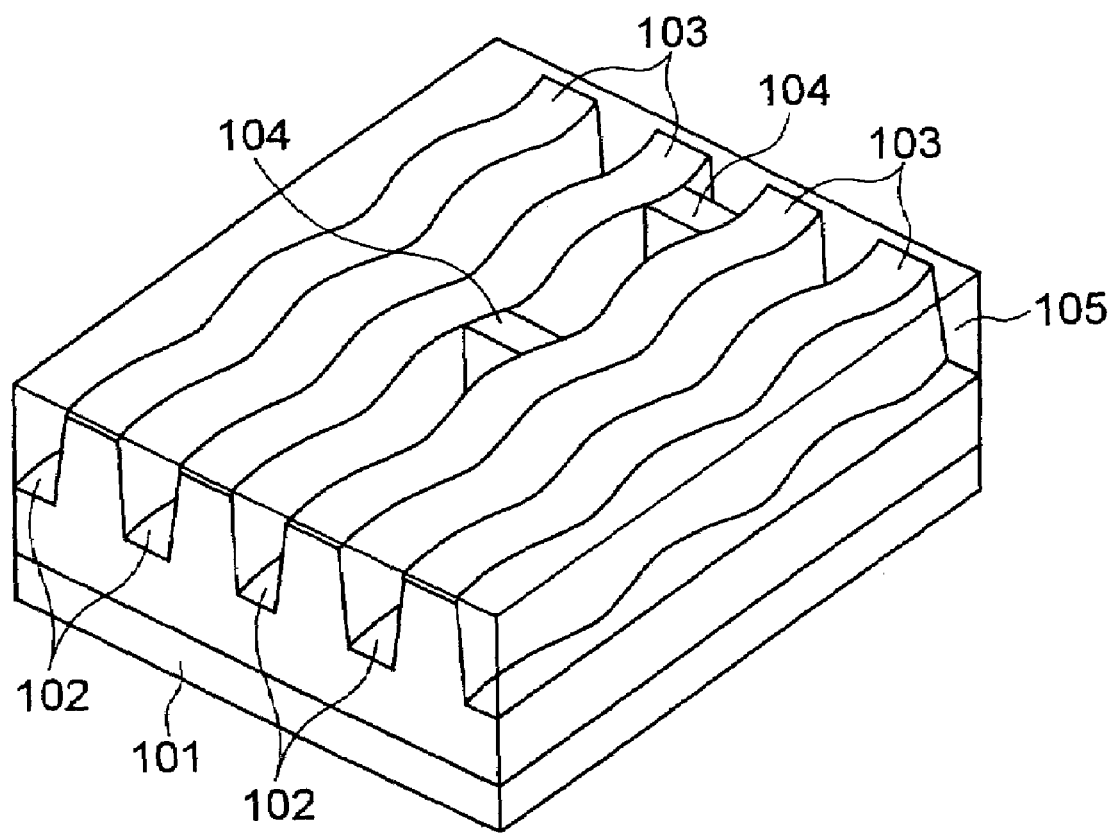
FIG. 4 is a diagram illustrating a physical structure of a recording surface of a DVD-RW or DVD-R.
Figure 5:
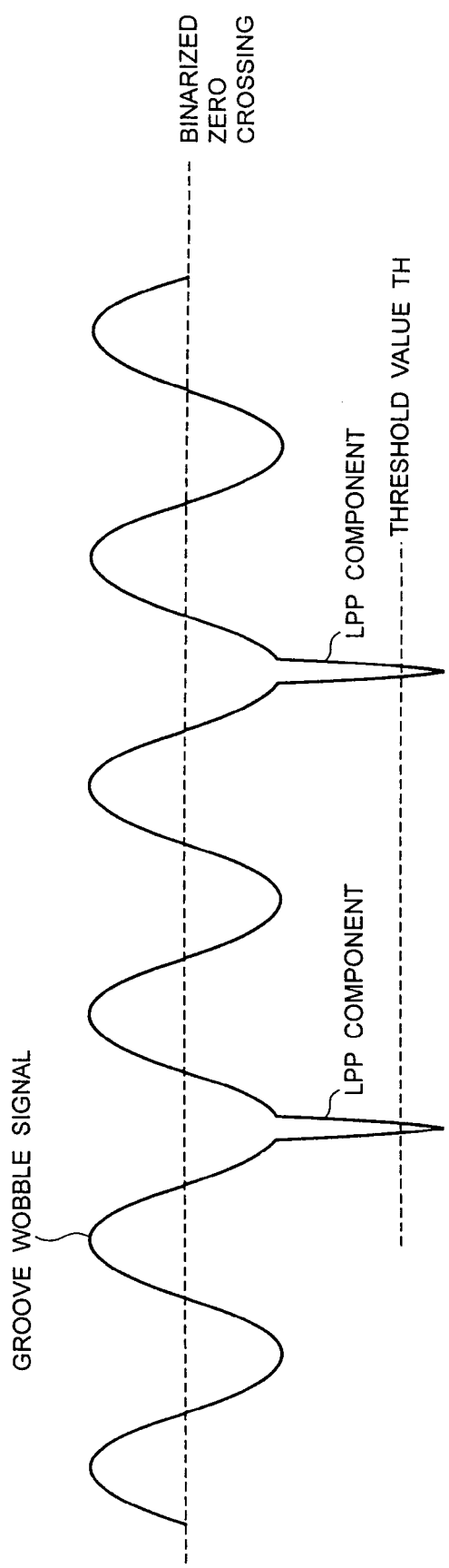
FIG. 5 is a graph illustrating the waveform of a groove wobble signal including LLP components.

FIG. 4 is a schematic perspective partial view of the recording surface of DVD-RW or DVD-R, illustrating its physical structure. Referring to FIG. 4, the recording surface is realized by combining a groove wobble system of wobbled grooves 103, formed between lands 102 on a disk substrate 103, operating as recording tracks and land pre-pits (LPPs) 104 formed in the lands 102 to link adjacent grooves 103. Information is recorded only in grooves 103. The recording surface is covered by a protection layer 105 typically made of polycarbonate. The signals obtained by the groove wobble system are mainly used to control the rotation motion of the disk during a recording operation and generate recording master clock for recording operations, whereas the LPPs are used for determining the recording position accurately on a bit by bit basis and also for obtaining various pieces of information on the disk such as pre-addresses. For example, as will be described hereinafter, the low frequency zone component of the output signal (push-pull signal) of multiplier 44 is the signal that is obtained by the groove wobble system (groove wobble signal), showing a sinusoidal waveform as illustrated in FIG. 5. The narrow width pulses produced in parts of the sinusoidal waveform correspond to LPP components that can be detected by comparing the level of the signal with a threshold value TH.

Figure 6:
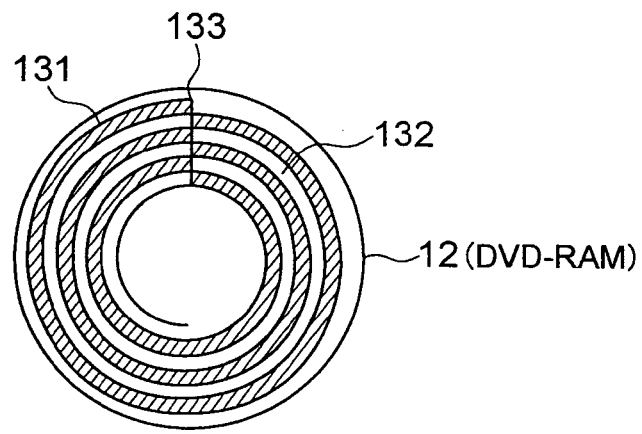
FIG. 6 is a schematic diagram illustrating recording tracks of a DVD-RAM.
Figure 7:
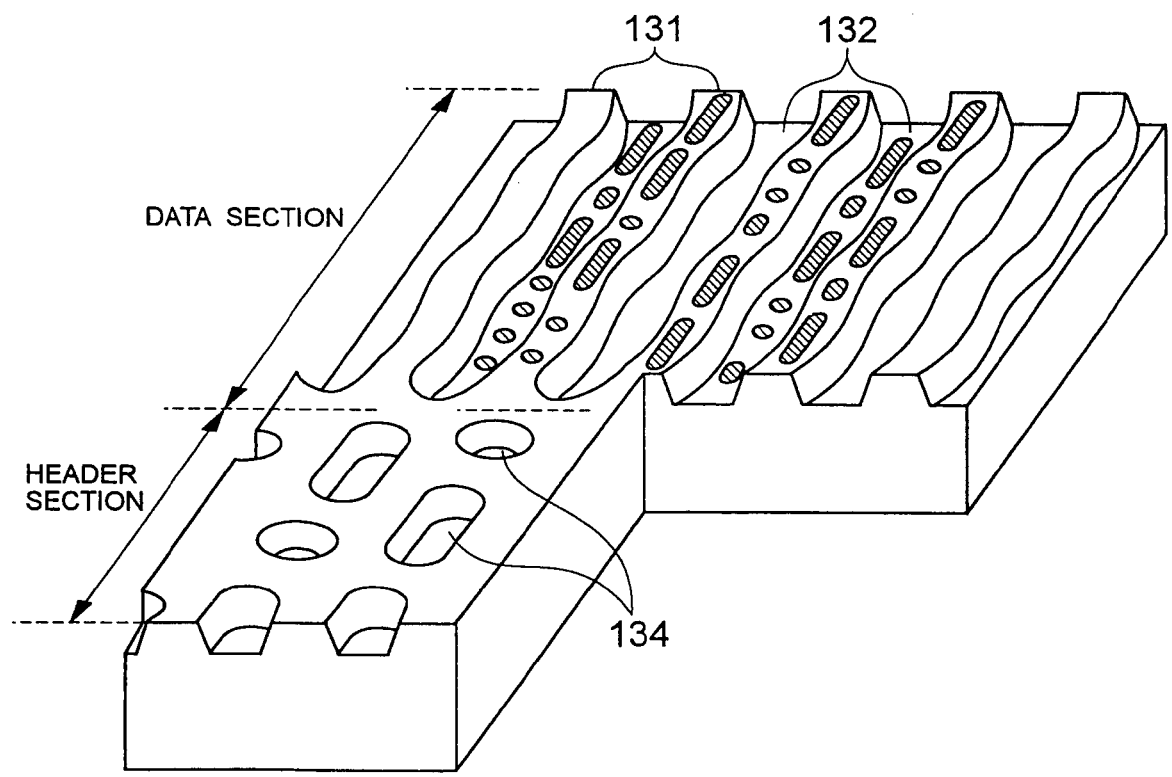
FIG. 7 is an enlarged view of a recording surface of the DVD-RAM of FIG. 6.

In the case of a DVD-RAM, helical tracks are formed on the disk in a manner as schematically shown in FIG. 6. FIG. 7 is an enlarged schematic perspective partial view of the recording surface of the DVD-RAM of FIG. 6. The tracks are wobbled as shown in FIG. 7. Lands 131 and grooves 132 are arranged alternately for the tracks. Changeover points 133 from the lands 131 to the respective grooves 132 are located on a same radial line. Data are recorded on the tracks on a sector by sector basis. In other words, a sector provides a unit for recording data. Each sector comprises a header section and a data section. The header section comprises physically embossed pits 134 that are displaced from the center line of the track and located near the boundary with the adjacent track. The data section stores data in the form of phase change pits that are formed by producing changes in the reflectance in the respective areas of the surface of the disk hit by a laser beam. More specifically, the changes are produced as a result of phase changes. The level of the signal read from the disk will be affected by the recording principle and the recording conditions of the signal.

Figure 8:
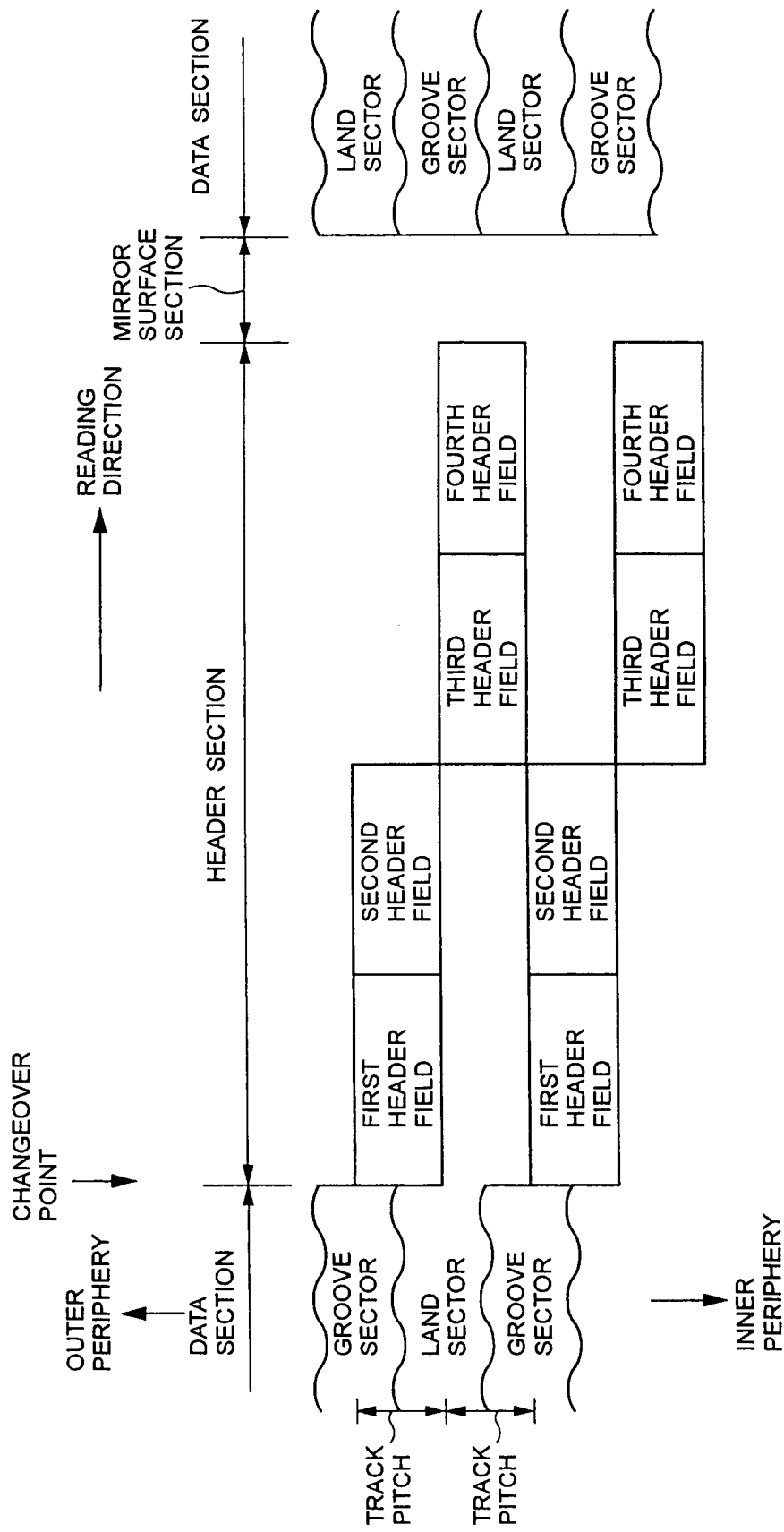
FIG. 8 is a schematic diagram illustrating the recording format of the header section of each sector located at a changeover point of the DVD-RAM of FIG. 6.
Figure 9:
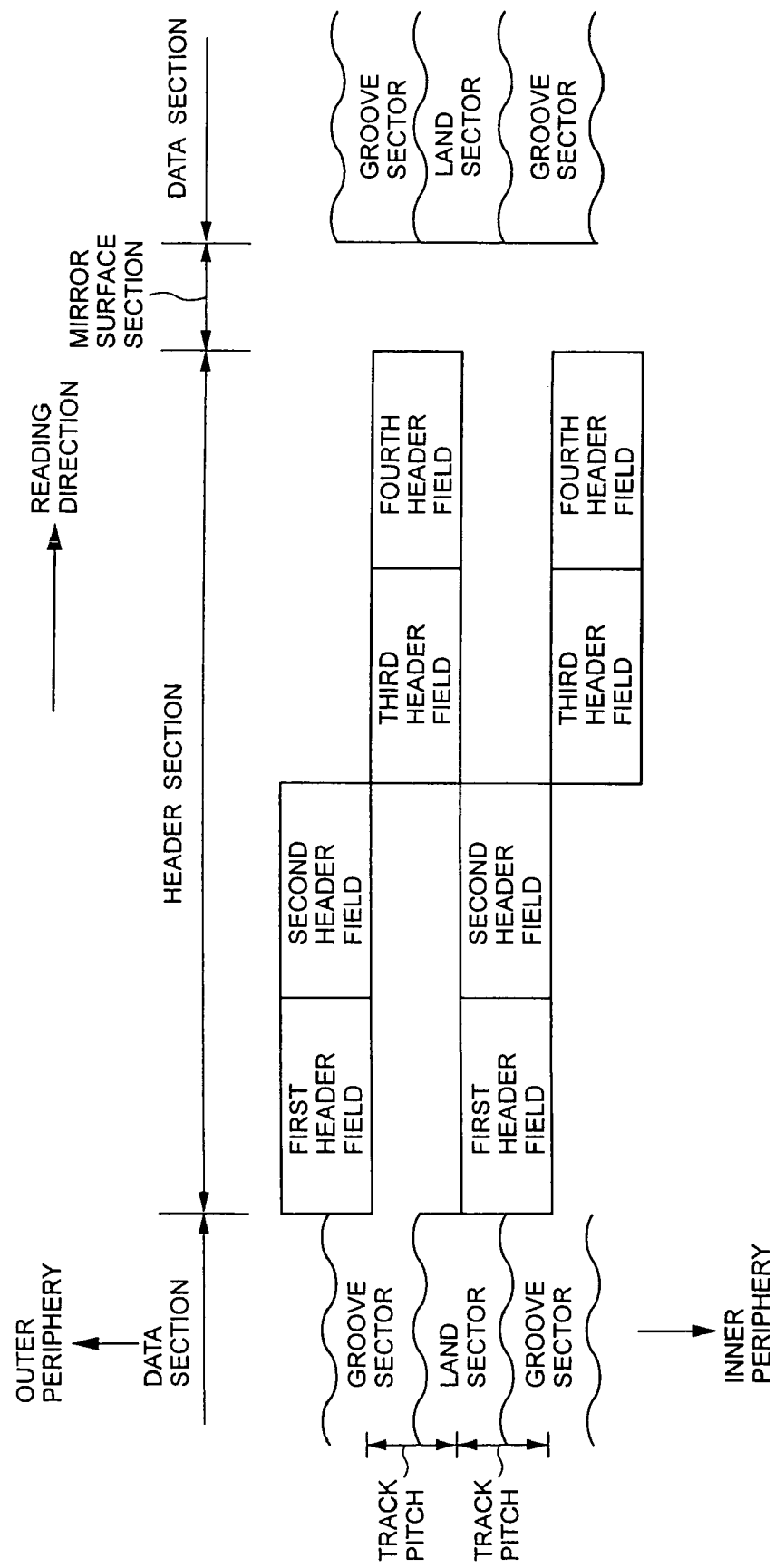
FIG. 9 is a schematic diagram illustrating the recording format of the header section of each sector without a changeover point of the DVD-RAM of FIG. 6.

FIG. 8 is a schematic illustration of the recording format of the header section of a sector located at a changeover point 133. FIG. 9 is a schematic illustration of the header section of a sector not related to any changeover point. Referring to FIGS. 8 and 9, the both sectors comprise a header section having four header fields, a mirror surface section located immediately after the header section and a data section having a land or groove structure as described above. An embossed pit is formed in each of the header fields although not shown in FIGS. 8 and 9. The leading two header fields, or the first and second header fields, of the four header fields of each land sector are displaced radially inwardly from the center line of the track (by a half of the track pitch), whereas the remaining two header fields, or the third and fourth header fields, of the land sector are displaced radially outwardly from the center line of the track (by a half of the track pitch). The four header fields of each groove sector are mirror images of the header fields of the corresponding land sector.

Figure 10:
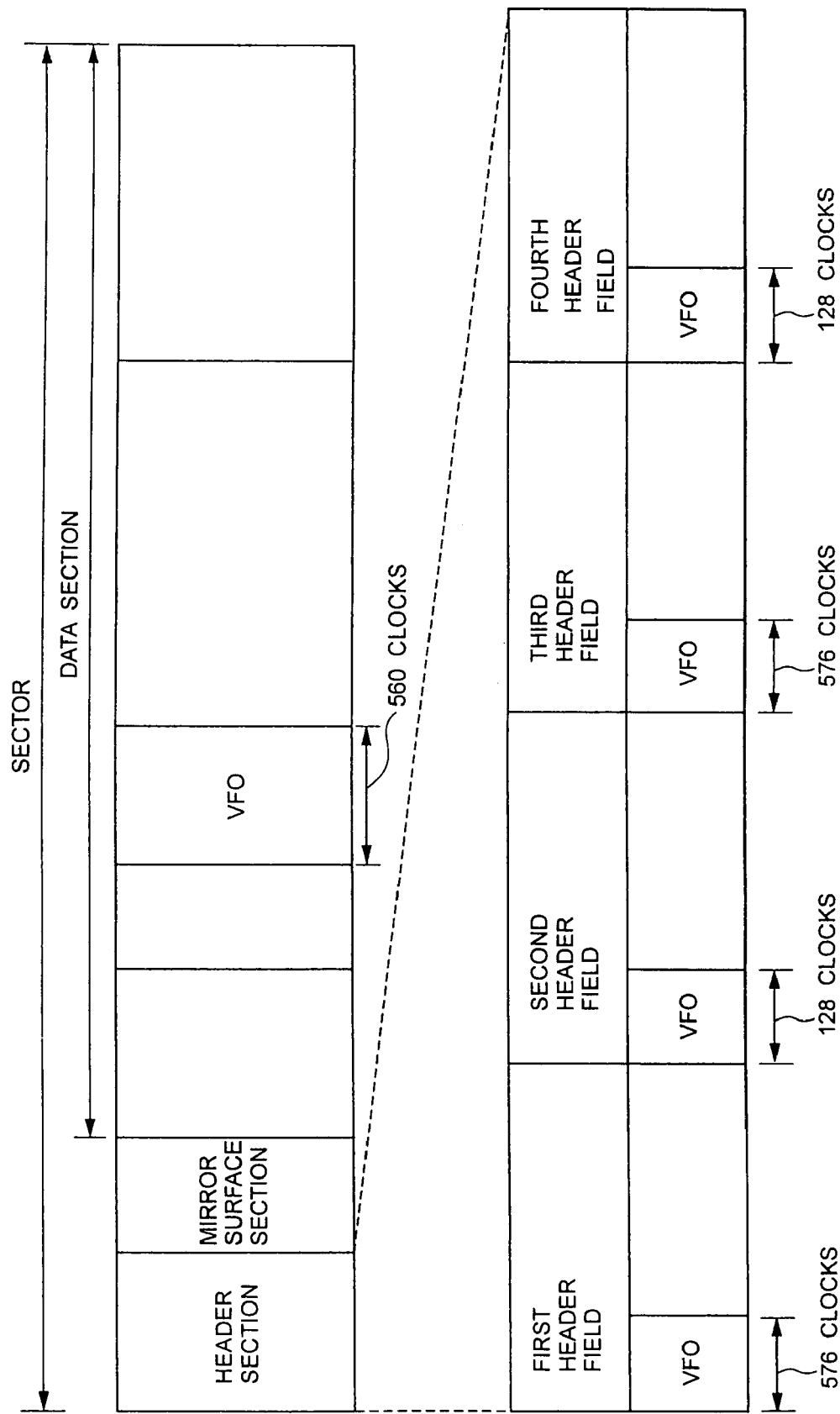
FIG. 10 is a schematic diagram illustrating VFO data of a header section and a data section.

A fixed data section referred to as VFO (variable frequency oscillator) is arranged in each of the header section and the data section of each sector as shown in FIG. 10. The VFO data of each VFO shows a predetermined data pattern of repeated "0s" and "1s" for every 4T (T representing the bit interval of successive information data). A VFO is arranged at the leading end of each of the first through fourth header fields of the header section in each sector. First VFO data of the first field and the third field have a length equal to 576 clocks, whereas second VFO data of the second field and the fourth field have a length equal to 128 clocks. A VFO data having a length equal to 560 clocks is arranged in the data section. For instance, a DVD-RAM contains these VFO data as part of fixed data without fail.

Figure 11:
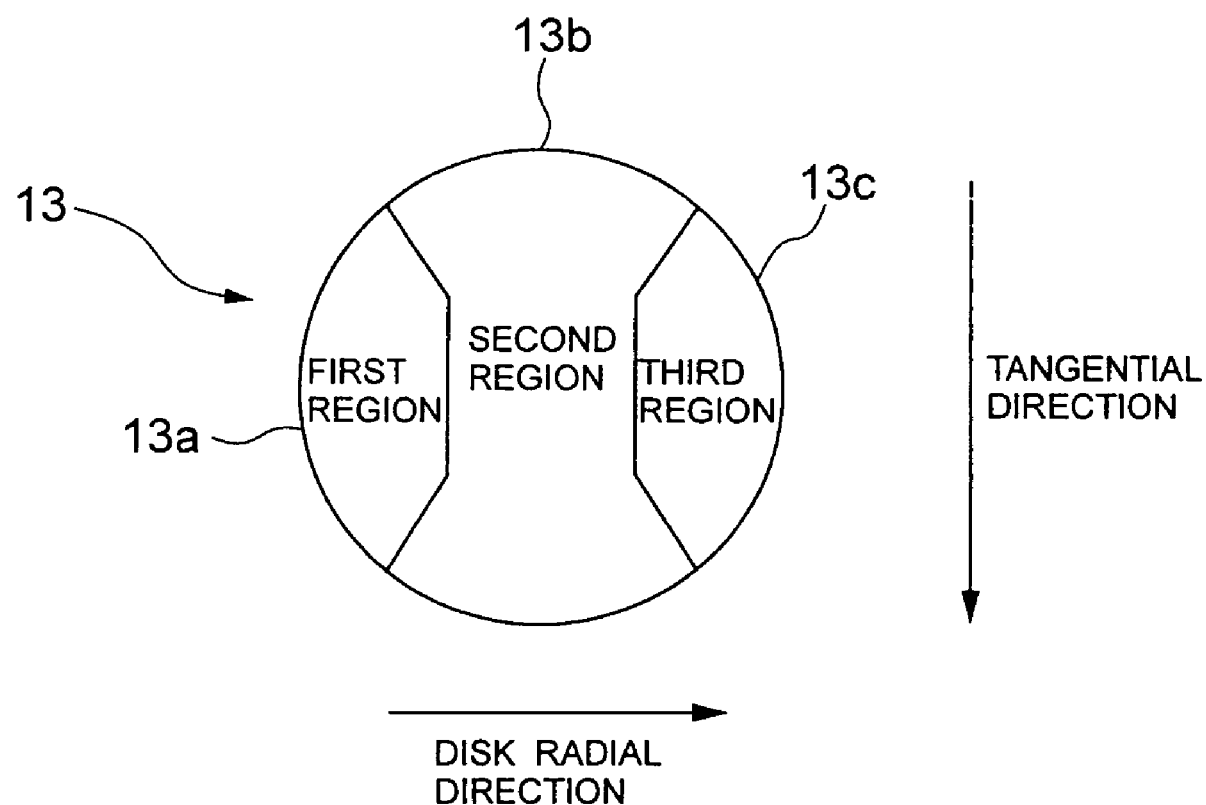
FIG. 11 is a schematic diagram illustrating different regions of a liquid crystal panel arranged in a pickup of FIG. 1.

A liquid crystal panel 13 is arranged on the optical axis of the beam of light in the pickup 10 for the purpose of correcting aberrations in radial directions of the disk in order to make it possible to correct the wave front aberrations of the optical system. The liquid crystal panel 13 is typically divided into three regions 13a through 13c along a radial direction as shown in FIG. 11. These regions include an inner peripheral side region, an intermediary region and an outer peripheral side region. The three regions 13a through 13c are individually and variably controlled by the respective drive voltages output from a tilt servo circuit 51 by way of a drive circuit 28 as will be described hereinafter. With this arrangement, the phase difference of light passing through each of the regions 13a through 13c can be changed individually so that the wave front aberrations such as coma that are produced by a tilt of the disk in a radial direction thereof may be corrected.

Figure 12:
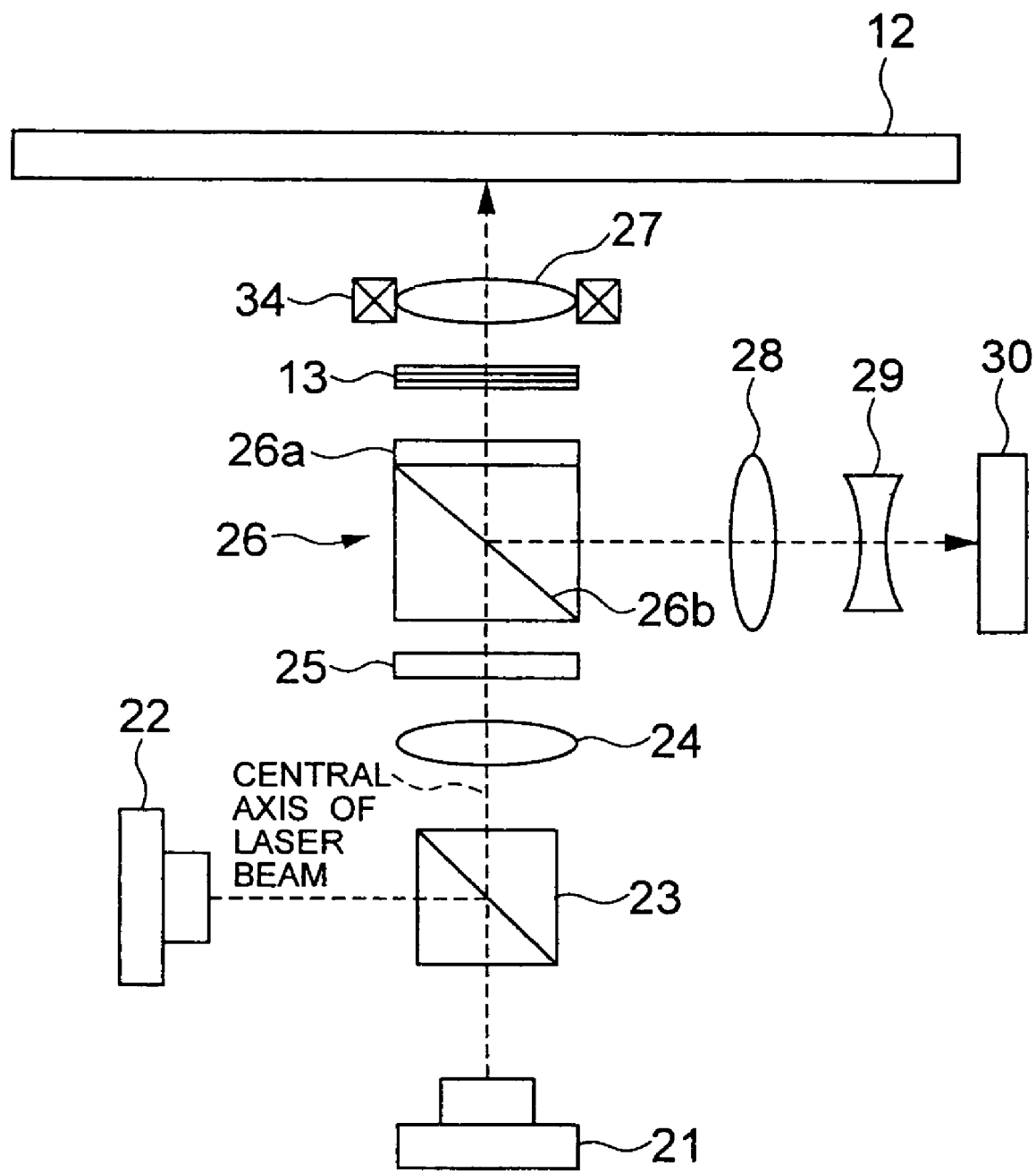
FIG. 12 is a structural diagram schematically illustrating the optical system of the pickup of FIG. 1.

As shown in FIG. 12, the optical system of the pickup 10 comprises a semiconductor laser element 21 for emitting a laser beam with a wavelength of 650 nm for DVDs and a semiconductor laser element 22 for emitting a laser beam with a wavelength of 780 nm for CDs. The semiconductor laser elements 21, 22 are arranged in such a way that the center lines of the laser beams emitted from them are perpendicular relative to each other. A conflux prism 23 is arranged across the laser beams emitted from the semiconductor laser elements 21, 22 so that the laser beam emitted from the semiconductor laser element 21 is transmitted through the conflux prism 23 whereas the laser beam emitted from the semiconductor laser element 22 is reflected by the conflux prism 23 and made to leave the latter in a direction same as that of the laser beam emitted from the semiconductor laser 21.

The semiconductor laser element 21 is driven by a drive circuit 18 whereas the semiconductor laser element 22 is driven by another drive circuit 19.

The laser beams coming from the conflux prism 23 are made to get to a polarization beam splitter 26 provided with a polarizer panel 26a by way of a collimator lens 24 and a grating 25. The grating 25 is arranged to divide the laser beams into a plurality of fluxes (flux of 0 order, those of ±1 order). In other words, a main beam and a pair of sub beams are formed by it. The polarization beam splitter 26 allows most (e. g., 90%) of the laser beam entering it to pass through it and the polarizer panel 26a transforms the linear polarization of the passing laser beam into circular polarization.

The laser beam that is allowed to pass through the polarization beam splitter 26 having the polarizer panel 26a then gets to the disk 12 by way of the liquid crystal panel 13 and the objective lens 27 thereof and becomes reflected by the recording surface of the disk 12. The laser beam reflected by the recording surface of the disk 12 then returns to the polarization beam splitter 26 by way of the liquid crystal panel 13 and the polarizer panel 26a. The polarizer panel 26a transforms the circular polarization of the reflected and returned laser beam into linear polarization. The polarization beam splitter 26 reflects the returned laser beam by means of its polarizing/splitting plane 26b. The reflected laser beam then gets to the light receiving plane of photo detector 30 by way of condenser lens 28 and multi lens 29.

The pickup 10 further comprises an actuator 34 having a focusing section for moving the objective lens 27 along the optical axis and a tracking section for moving the objective lens 27 in a radial direction of the disk that is perpendicular to the optical axis.

Figure 13:
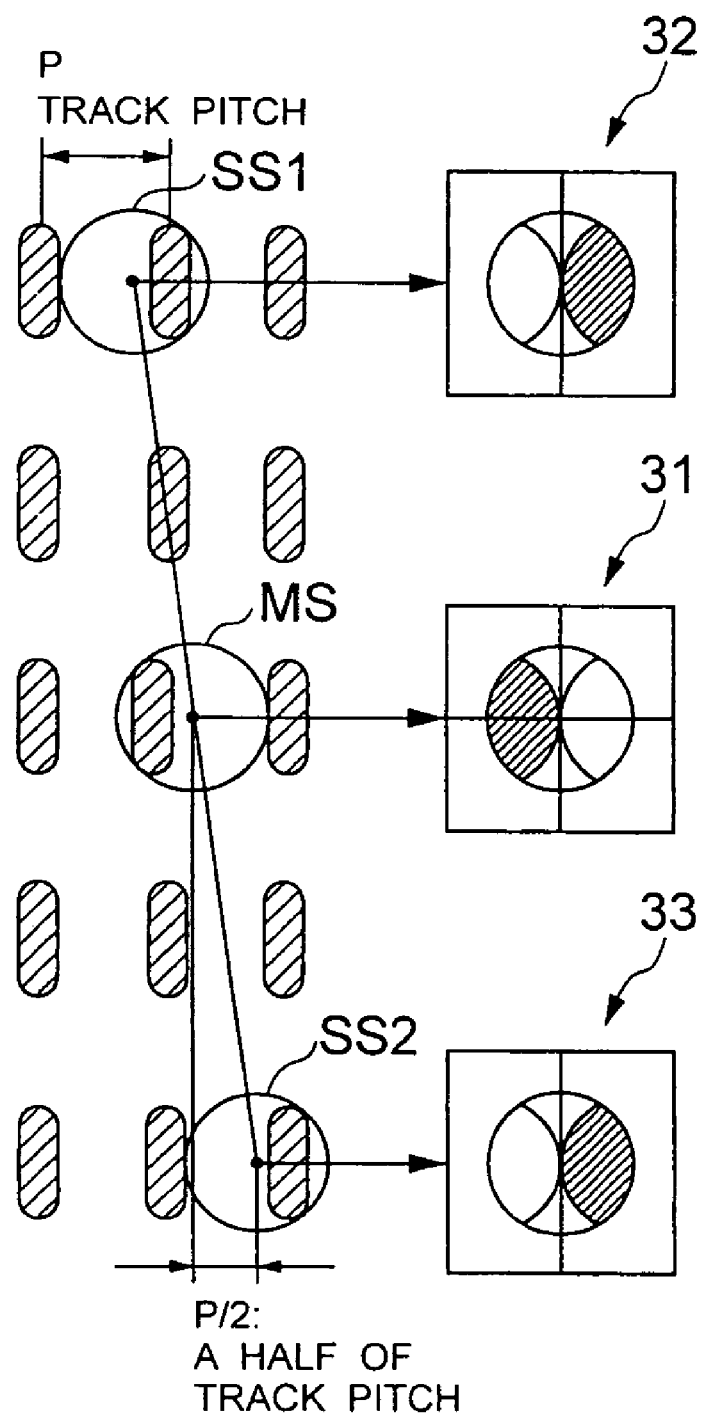
FIG. 13 is a schematic diagram illustrating beam spots formed on an optical disk.

As shown in FIG. 13, spots MS, SS1, SS2 are formed on the disk 12 by the main beam and the sub beams of the laser beam coming from the pickup 10. Note that the two sub beam spots SS1, SS2 are displaced from the main beam spot MS in a radial direction of the disk by a half of the track pitch P. This is because the differential push-pull method is used for detecting tracking errors.

Figure 14:
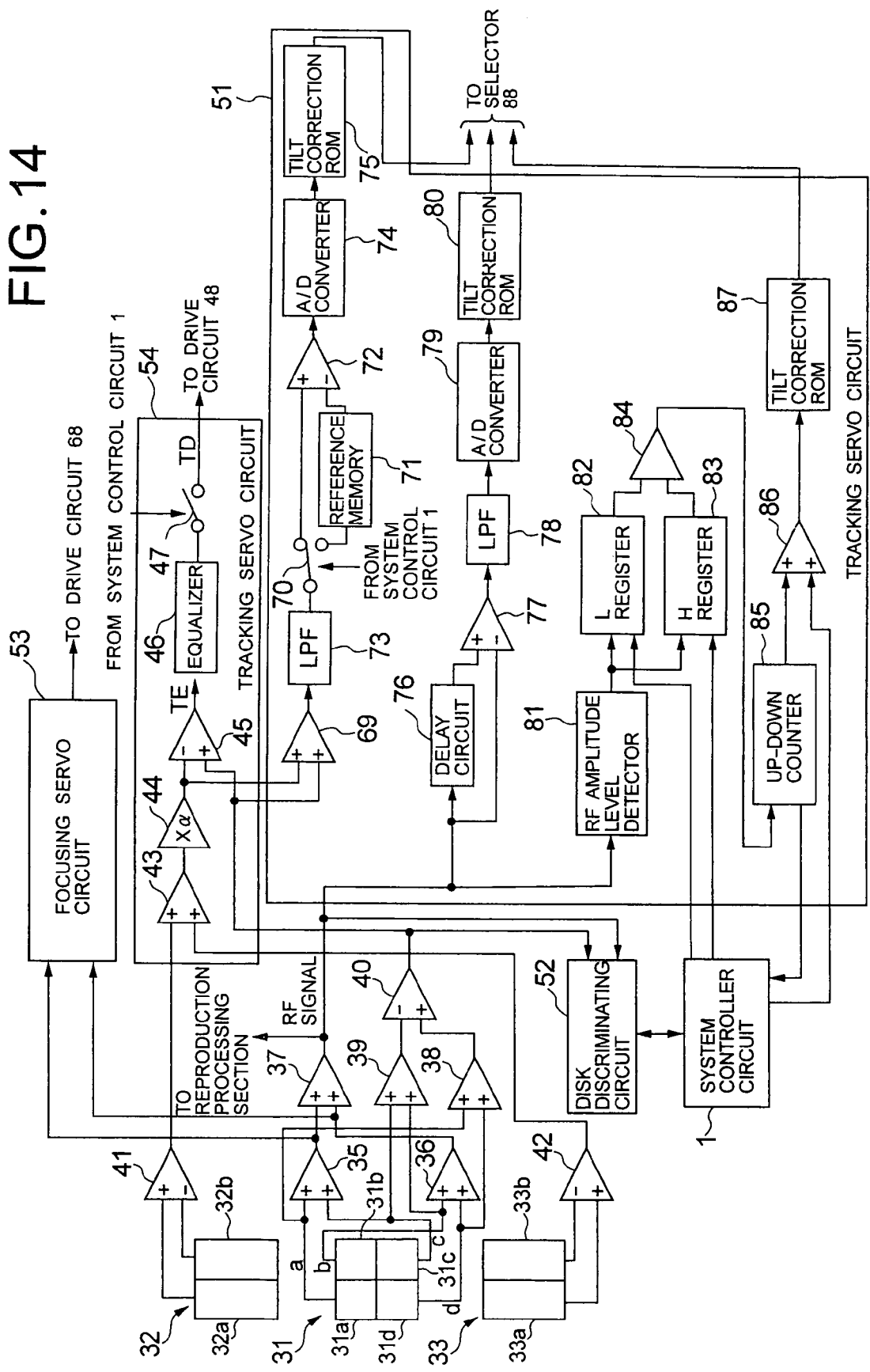
FIG. 14 is a schematic block diagram illustrating a circuit including a pickup, a tracking servo circuit and a tilt servo circuit.

As shown in FIGS. 13 and 14, the photo detector 30 comprises a light receiving section 31 for receiving a main beam and a pair of light receiving sections 32, 33 for receiving sub beams arranged at opposite sides of the light receiving section 31. The light receiving surface of the light receiving section 31 is divided into four areas to produce photo detecting elements 31a through 31d, whereas the light receiving surfaces of the light receiving sections 32, 33 are divided into two areas to produce photo detecting elements 32a, 32b and 33a, 33b.

As shown in FIG. 14, the pickup 10 comprises an adder 35 for adding the output signal a of the photo detecting element 31a and the output signal c of the photo detecting element 31c, another adder 36 for adding the output signal b of the photo detecting element 31b and the output signal d of the photo detecting element 31d and still another adder 37 for outputting an RF signal (read signal) by adding the output signals of the adders 35, 36. The output of the adder 37 is connected to the tilt servo circuit 51 and the disk type discriminating circuit 52 of a servo circuit 5 as well as to a reproduction processing section (not shown). The outputs of the adders 35, 36 are connected to a focusing servo circuit 53.

Figure 15:
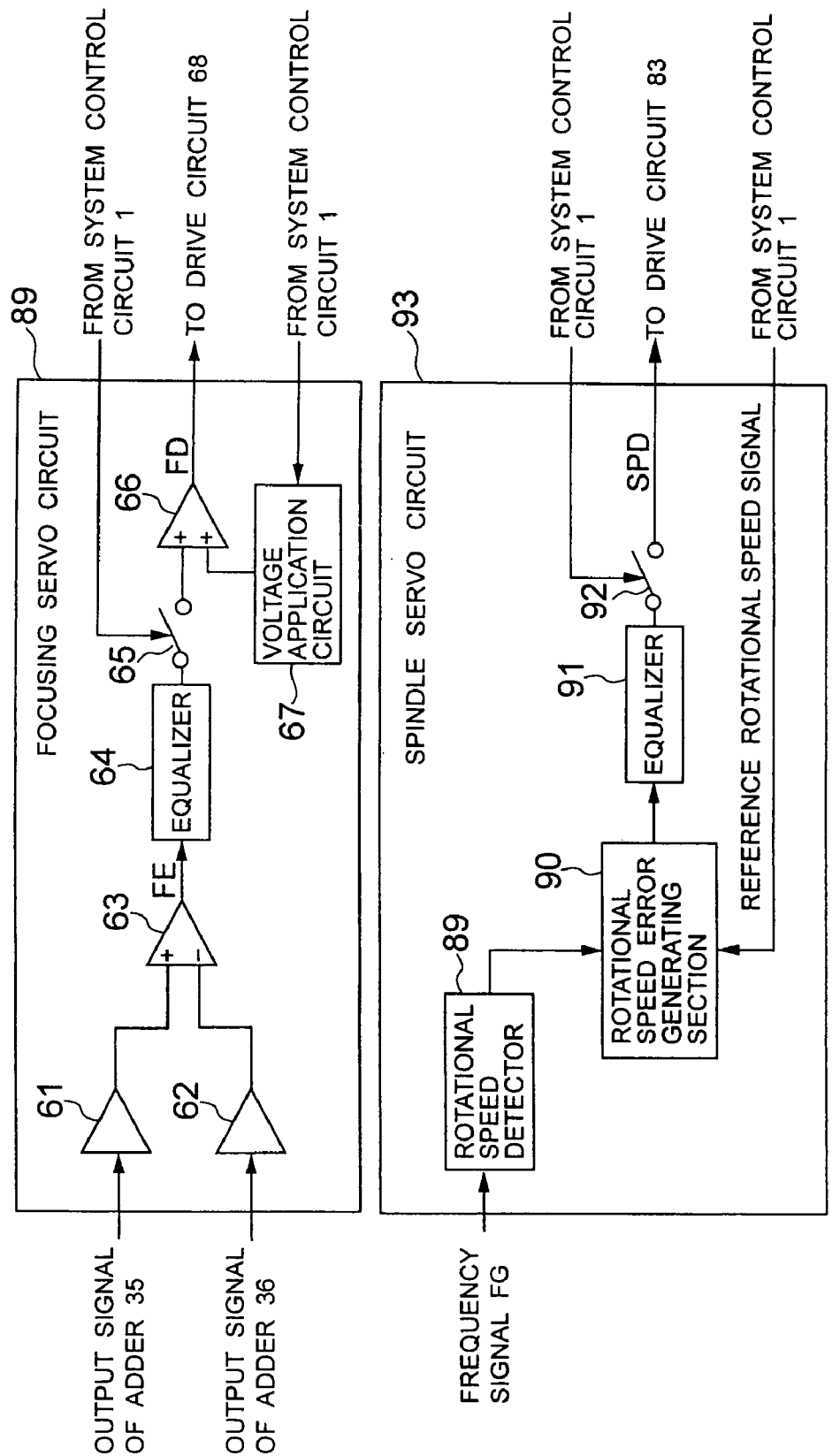
FIG. 15 is a schematic block diagram of a focusing servo circuit and a spindle servo circuit.
Figure 16:
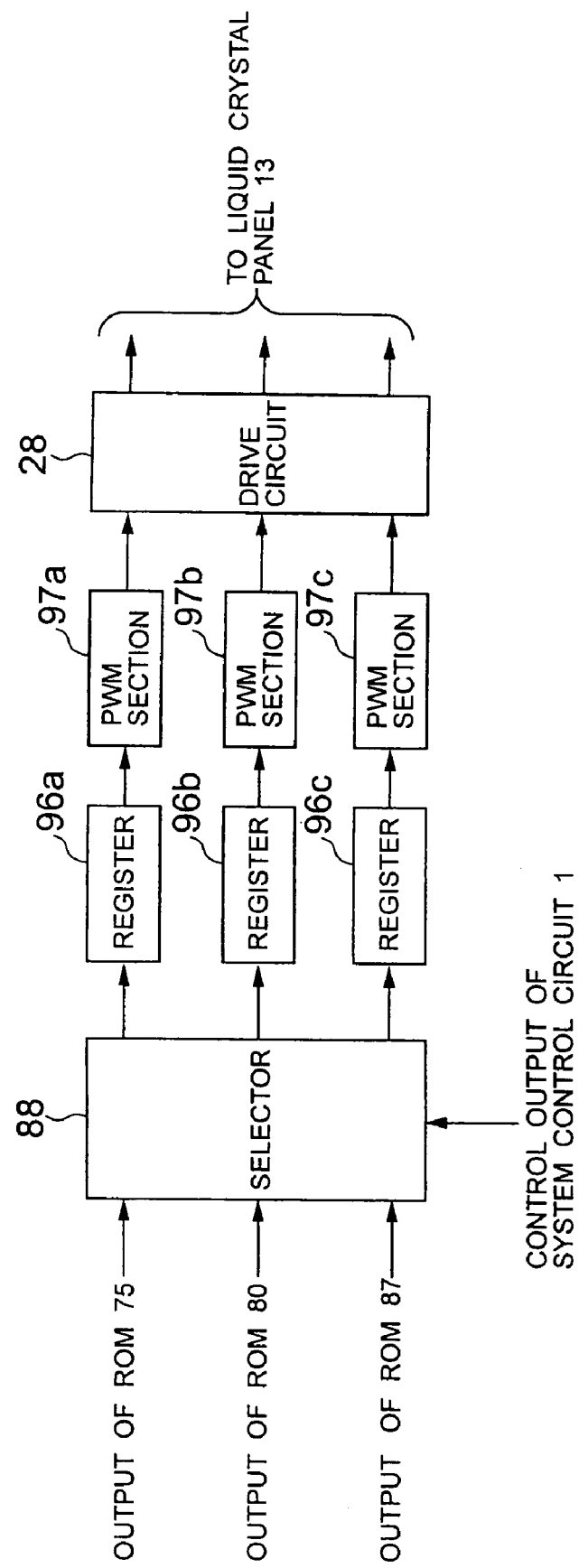
FIG. 16 is a schematic block diagram of a tilt servo drive system.

As shown in FIG. 15, the focusing servo circuit 53 comprises an amplifier 61 for amplifying the output signal of the adder 35, another amplifier 62 for amplifying the output signal of the adder 36, a subtracter 63 for generating a focus error signal FE by subtracting the output signal of the amplifier 62 from the output signal of the amplifier 61, an equalizer 64 for generating a focus drive signal FD in accordance with the focus error signal FE that is the output signal of the subtracter 63, a switch 65, still another adder 66 and a voltage application circuit 67 for generating a variable voltage. The focus drive signal FD output from the equalizer 64 is fed to drive circuit 68 by way of the switch 65 and the adder 66 when the switch 65 is on. The drive circuit 68 drives the focusing section of the actuator 34 in accordance with the focus drive signal FD. The on/off operations of the switch 65 are controlled by the system control circuit 1. The voltage application circuit 67 generates a variable voltage in accordance with the focus jump command from the system control circuit 6. As a variable voltage is generated by the voltage application circuit 67, it is added by the adder 66 and the output signal of the adder 66 become the focus drive signal FD.

The pickup 10 additionally comprises an adder 38 for adding the output signal a of the photo detecting element 31a and the output signal d of the photo detecting element 31d, another adder 39 for adding the output signal b of the photo detecting element 31b and the output signal c of the photo detecting element 31c and a subtracter 40 for subtracting the output signal of the adder 39 from that of the adder 38. The output of the subtracter 40 is connected to the disk type discriminating circuit 52 and the tracking servo circuit 54 of the servo circuit 5. The output signal of the subtracter 40 is a push-pull signal.

As shown in FIG. 14, the pickup 10 further comprises a subtracter 41 for subtracting the output signal of the photo detecting element 32b from the output signal of the photo detecting element 32a and another subtracter 42 for subtracting the output signal of the photo detecting element 33b from the output signal of the photo detecting element 33a. The outputs of the subtracters 41, 42 are connected to the tracking servo circuit 54.

As shown in FIG. 14, the tracking servo circuit 54 comprises an adder for adding the output signals of the subtracters 41, 42, a multiplier 44 for multiplying the output signal of the adder 43 by a coefficient α, a subtracter 45 for generating a differential push-pull tracking error signal TE by subtracting the output signal of the multiplier 44 from the output signal (push-pull signal) of the subtracter 40, an equalizer 46 for generating a tracking drive signal TD in accordance with the tracking error signal TE output from the subtracter 45 and a switch 47.

The coefficient α of the adder 44 is determined in such a way that the output signal (push-pull of the main beam) of the subtracter 40 and the output signal (push-pull of the sub beams) of the multiplier 44 are made substantially equal to each other. Note that these two output signals have respective AC components whose polarities are opposite to each other and respective DC components that show a same polarity.

The equalizer 46 generates the tracking drive signal TD so as to reduce the tracking error signal TE. The tracking drive signal TD output from the equalizer 46 is fed to the drive circuit 48 by way of the switch 47 when the switch 47 is on. The drive circuit 48 drives the tracking section of the actuator 34 in accordance with the tracking drive signal TD. The on/off operations of the switch 47 are controlled by the system control circuit 1.

The tilt servo circuit 51 generates a tilt drive signal TID for driving the above described liquid crystal panel 13 and is provided with three tilt servo sections, or the first through third tilt servo sections, that are adapted to selectively operate depending on the type of the disk 12. The first tilt servo section is used for DVD-Rs and DVD-RWs and, as shown in FIG. 14, comprises an adder 69, a low pass filter 73, a changeover switch 70, a reference memory 71, a subtracter 72, an A/D converter 74 and a tilt correction ROM 75. The adder 69 adds the output signal of the subtracter 40 in the pickup 10 and that of the multiplier 44 in the tracking servo circuit 54.

Since the coefficient α of the multiplier 44 is determined in a manner as described above, the push-pull component of the output of the adder 69 is cancelled to leave only the DC component. The output signal of the adder 69 is smoothed as it is input to the low pass filter 73 so that the eccentric component of the disk will be removed. The output signal of the low pass filter 73 is supplied to the reference memory 71 by way of the changeover switch 70 to represents a state involving no tilt before an information recording operation and the reference memory 71 stores the supplied signal level as reference signal. The changeover switch 70 relays the output signal of the low pass filter 73 to the subtracter 72 during a recording operation. During a recording operation, the output signal of the low pass filter 73 is a push-pull signal containing an offset component that varies as a function of the tilt of the disk 12, or a push-pull offset signal. The subtracter 72 generates a first tilt error signal representing the tilt of the disk 12 by subtracting the reference signal stored in the reference memory 71 from the output signal of the adder 69.

During a recording operation, the output signal of the multiplier 44 and that of the subtracter 40 are tracking error signals containing an offset component that represents the tilt of the disk 12. The signal obtained by removing the offset component from the signal produced as the sum of the two signals by means of the adder 69 is stored in the reference memory 71 as reference signal. Thus, the signal output from the subtracter 72 as a result of subtracting the reference signal from the output signal of the adder 69 contains only the offset component so that it is possible to provide the first tilt error signal.

The first tilt error signal is digitized by the A/D converter 74 and then fed to the tilt correction ROM 75, which stores a plurality of tilt correction values and output three correction values stored at the respective addresses specified by the first tilt error signal. These three correction values correspond respectively to the three regions 13a through 13c of the liquid crystal panel 13.

While the low pass filter 73 is provided in this embodiment, it may be omitted and the first tilt error signal may be obtained directly from the subtracter 72 when the eccentric component of the disk is small.

Additionally, while the output signal of the subtracter 40 and that of the multiplier 44 are added by the adder 70 in this embodiment, it may alternatively be so arranged that only either the output signal (main push-pull signal) of the subtracter 40 or the output signal (sub push-pull signal) of the multiplier 44 is smoothed by the low pass filter and fed to the reference memory 71 by way of the changeover switch 70.

As shown in FIG. 14, the second tilt servo section that is used for DVD-RAMs comprises a delay circuit 76, a subtracter 77, a low pass filter 78, an A/D converter 79 and a tilt correction ROM 80. The delay circuit 76 delays the RF signal output form the adder 37 and supplies it to the subtracter 77. The RF signal corresponds to the first VFO data (of 64 bytes) in the first and third header fields of the above described header format of DVD-RAM. The delay time of the delay circuit 76 corresponds to the time necessary for passing through the first header field and the second header filed of the header section. Thus, while the first VFO data of the first header field is fed from the delay circuit 76 to one of the input terminals (non-inversion input terminal) of the subtracter 77, the first VFO data of the third header field is fed to the other input terminal (inversion input terminal) of the subtracter 77. The subtracter 77 subtracts the first VFO data of the third head field from the first VFO data of the first header field and supplies a signal representing the different to the low pass filter 78. The low pass filter 78 smooths the signal obtained by the subtraction and generates a second tilt error signal. The second tilt error signal is digitized by the A/D converter 79 and then fed to the tilt correction ROM 80, which stores a plurality of tilt correction values and output three correction values stored at the respective addresses specified by the second tilt error signal. These three correction values output from the tilt correction ROM 80 correspond respectively to the three regions 13a through 13c of the liquid crystal panel 13. Japanese Patent Laid-Open Publication No. 2000-137923 describes the generation of tilt error signal of a tilt servo section to be used for DVD-RAMs in greater detail.

The third tilt servo section for DVD-ROMs uses a so-called hill climbing method for the purpose of generating correction values in order to maximize the RF signal. As shown in FIG. 14, it comprises an RF amplitude level detector 81, an L register 82, an H register 83, a comparator 84, an up-down counter 85, an adder and a tilt correction ROM 87. The RF amplitude level detector 81 detects the amplitude level of the RF signal. The L register 82 holds the amplitude level of the RF signal obtained by using the current output value of the up-down counter 85 as address value for the tilt correction ROM 87. The H register 83 holds the amplitude level of the RF signal obtained by adding the output value of the up-down counter 85 and 1 by means of the adder 86 and using the sum as address value for the tilt correction ROM 87. The adder 86 performs the addition of 1 in response to the command from the system control circuit 1. The comparator 84 compares the amplitude level held in the L register 82 and the one held in the H register 83. If the value held in the L register 82 is found to be larger than the value held in the H register 83 as a result of the comparison made by the comparator 84, the up-down counter 85 counts up by 1. If, on the other hand, the value held in the L register 82 is found to be smaller than the value held in the H register 83 as a result of the comparison made by the comparator 84, the up-down counter 85 counts down by 1. The tilt correction ROM 87 outputs the correction values stored at the respective addresses specified by the output value of the adder 86. The three correction values output from the tilt correction ROM 87 correspond respectively to the three regions 13a through 13c of the liquid crystal panel 13.

As a tilt servo start command is issued to the above described tilt servo section for DVD-ROMs, the current output value of the up-down counter 85 is set in the tilt correction ROM 87 by way of the adder 86 as address value. Then, as a result, the liquid crystal panel 13 is driven by way of a servo drive system, which will be described hereinafter. The amplitude level of the RF signal detected by the RF amplitude level detector 81 is held by the L register 82. Then, 1 is added to the current output value of the up-down counter 85 by the adder 86 and the sum is set in the tilt correction ROM 87 as address value and used to drive the liquid crystal panel 13 by way of the tilt servo drive system. The amplitude level of the RF signal detected by the RF amplitude level detector 81 is held by the H register 83. The comparator 84 compares the value held by the L register. 82 with the value held by the H register 83 and counts up 1 by when the value held by the L register 82 is larger than the value held by the H register 83, whereas it counts down by 1 when the value held by the L register 82 is smaller than the value held by the H register 83. Then, the above operation is repeated. Japanese Patent Laid-Open Publication No. Hei. 11-3531 describes such a tilt servo section for DVD-ROMs in greater detail.

The outputs of the three tilt correction ROMs 75, 80, 87 are connected to selector 88 and then to tilt servo drive system comprising registers 96a through 96c, PWM sections 97a through 97c and a drive circuit 28. The selector 88, the registers 96a through 96c and the PWM sections 97a through 97c are contained in the servo circuit 5. The selector 88 relays one of the corrected output values of the tilt correction ROMs 75, 80, 87. The output of the selector 88 is connected to the registers 96a through 96c for holding a corrected value. The outputs of the registers 96a through 96c are connected to the respective PWM (pulse width modulator) sections 97a through 97c. The PWM sections 97a through 97c perform pulse-width modulates in accordance with the respective output values of the registers 96a through 96c and supply the respective modulated signals to the drive circuit 28 as tilt drive signals TID.

Regardless which one of the tilt correction ROMs 75, 80, 87 supplies a corrected value to the registers 96a through 96c of the tilt servo drive system by way of the selector 88, the corrected value held by the register 96a and the one held by the register 96c are symmetrical relative to the corrected value held by the register 96b. A drive signal having a pulse width corresponding to the corrected value held by the register 96a is generated by the PWM section 97a. Similarly, a drive signal having a pulse width corresponding to the corrected value held by the register 96b is generated by the PWM section 97b. Likewise, a drive signal having a pulse width corresponding to the corrected value held by the register 96c is generated by the PWM section 97c. The drive circuit 28 applies voltages respectively to the regions 13a through 13c in accordance with the respective levels of the corresponding drive signals. As a result of the voltage application, a light path difference $\Delta n \cdot d$ ($\Delta n$ is the variation of the refractive index and d is the liquid crystal cell thickness) is produced by the double refraction effect of liquid crystal molecules in the regions 13a through 13c. If the wavelength of a light beam passing through the liquid crystal is $\lambda$, a phase difference of $\Delta n \cdot d$ ($2\pi/\lambda$) is given to the light beam. Thus, it is now possible to correct the aberrations including the coma generated in a radial direction of the disk due to the tile of the disk.

As shown in FIG. 15, the servo circuit 5 has a spindle servo circuit 93 comprising a rotational speed detector 89, a rotational speed error generator 90, an equalizer 91 and a switch 92. A frequency signal FG is fed to the rotational speed detector 89. A frequency signal FG is an AC signal representing the current revolution frequency of the spindle motor 14 for driving the optical disk 12 to rotate by way of a turn table. The rotational speed detector 89 generates a rotational speed signal indicating the rotational speed of the spindle motor that corresponds to the frequency signal FG and supplies it to the system control circuit 1 and also to the rotational speed error generating section 90. The rotational speed error generating section 90 generates a rotational speed error signal indicating the difference between the rotational speed signal and the reference rotational speed signal fed from the system control circuit 1 and supplies it to the equalizer 91. In response to the rotational speed error signal, the equalizer 91 generates a spindle drive signal SPD, which is fed to the spindle motor 14 by way of the drive circuit 83 when the switch 92 is on. The spindle motor 14 drives the optical disk 12 to rotate with the rotational speed indicated by the spindle drive signal SPD. The AC generator (not shown) arranged in the spindle motor 14 supplies the frequency signal FG representing the current revolution frequency to the servo circuit 5. Thus, with the above-described arrangement of the spindle servo system, the spindle motor 14 is driven to rotate with the rotational speed indicated by the reference rotational speed signal fed from the system control circuit 1.

Although not shown, the servo circuit 5 generates a slider drive signal SD on the basis of the above tracking error signal TE and supplies it to the slider 100 by way of the drive circuit 8. As a result, the slider 100 moves the pickup 10 in a radial direction of the disk with a rotational speed corresponding to the drive current based on the slider drive signal SD.

The disk type discriminating circuit 52 determines the type of the disk 12 mounted on the turn table. As pointed out earlier, the disks 12 may be a CD type disk such as CD, CD-ROM or CD-R or a DVD type disk such as DVD, DVD-ROM, DVD-R, DVD-RAM or DVD-RW.

Now, the operation of the disk discriminating circuit 52 will be described by referring to the flow charts of FIGS. 17 and 18.

Figure 17:
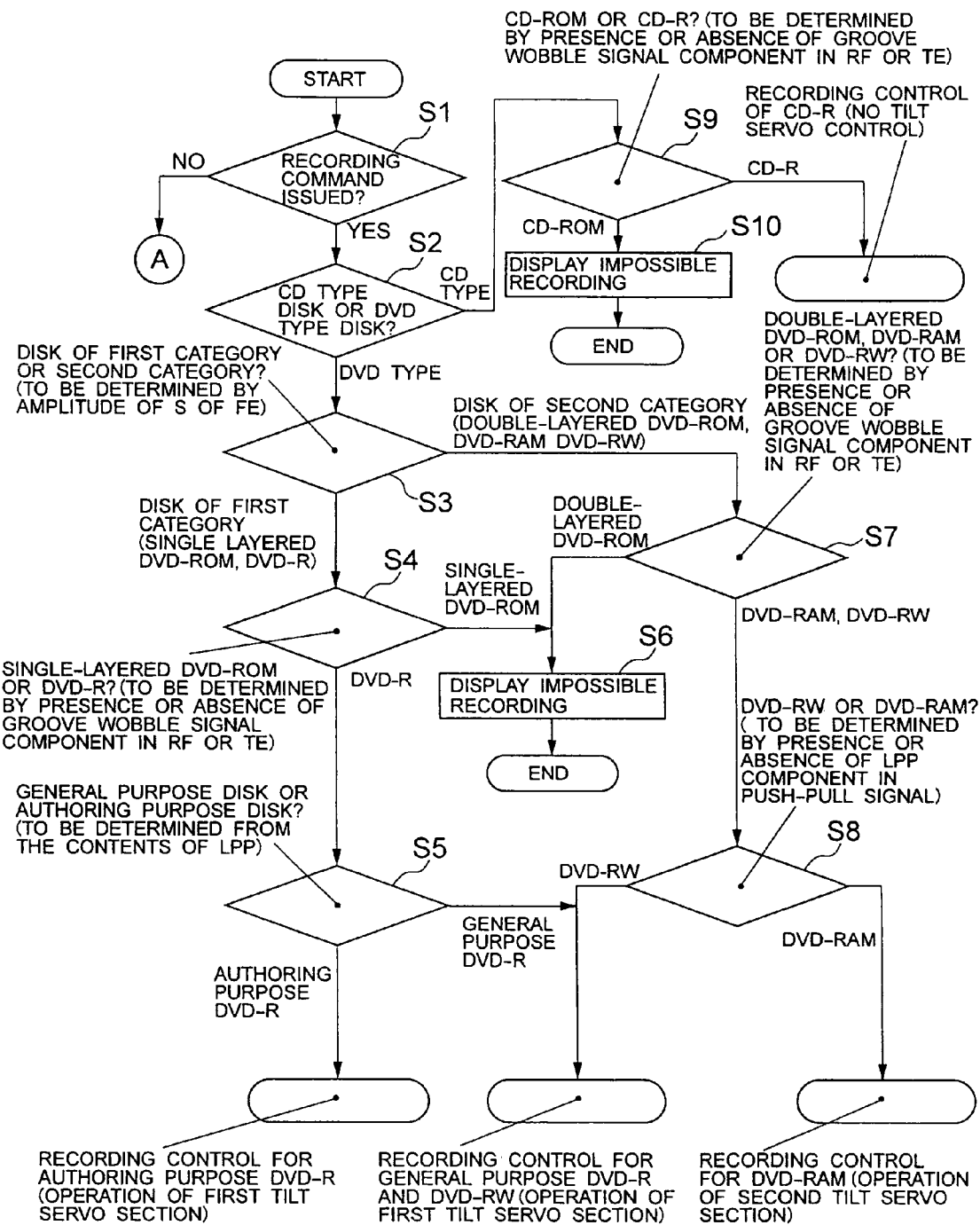
FIG. 17 is a flow chart illustrating the operation of a disk type discriminating circuit.
Figure 18:
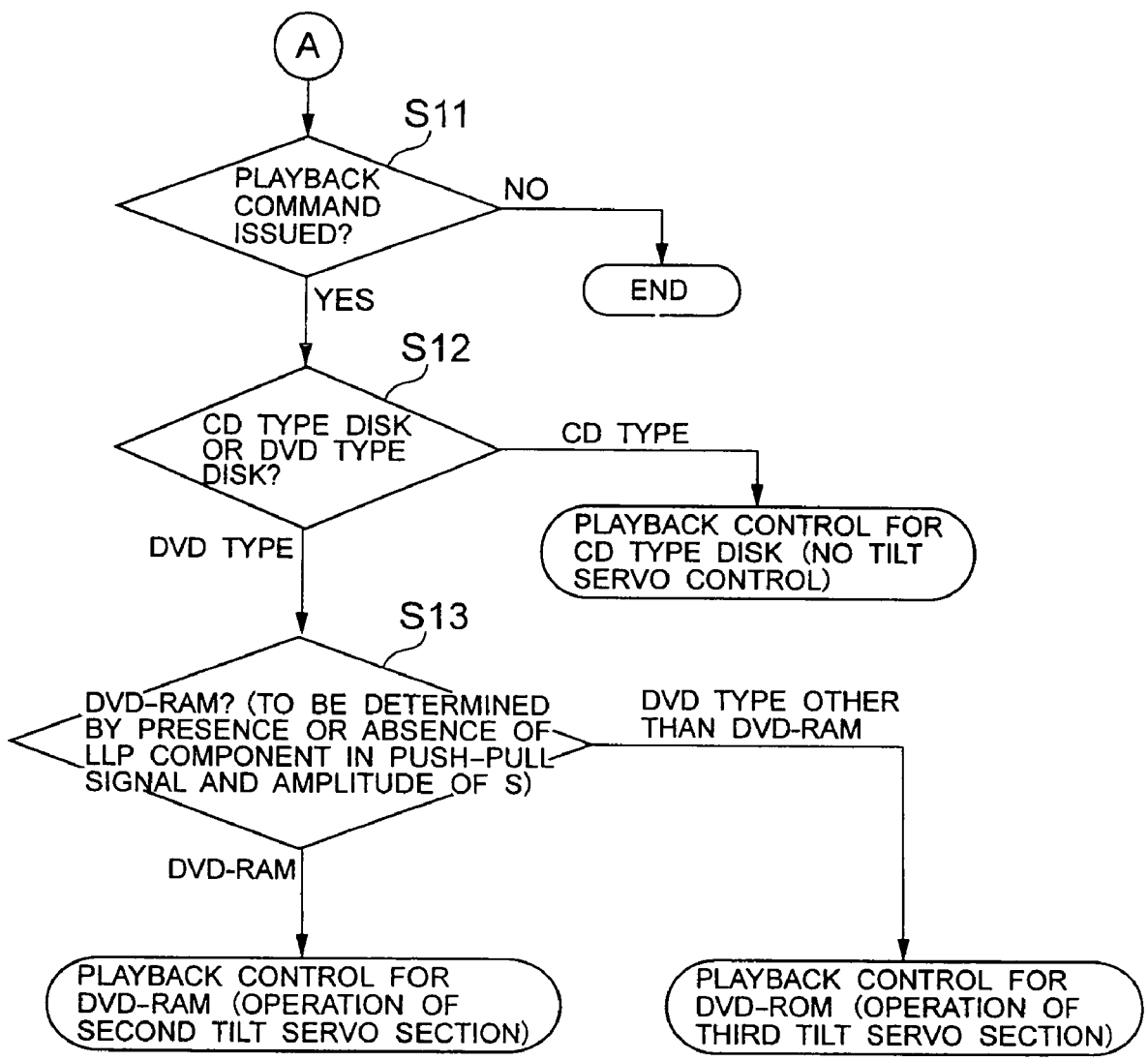
FIG. 18 is the remaining portion of the flow chart of FIG. 17.
Figure 19:
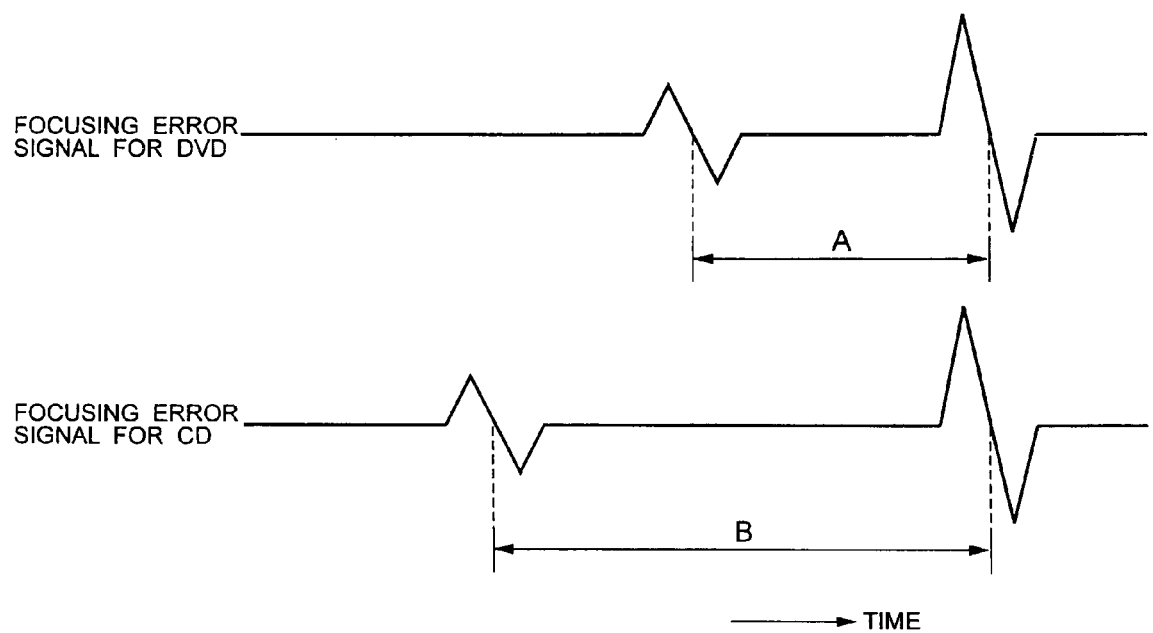
FIG. 19 is a graph illustrating the S-characteristics of a CD type disk and a DVD type disk.
Figure 20:
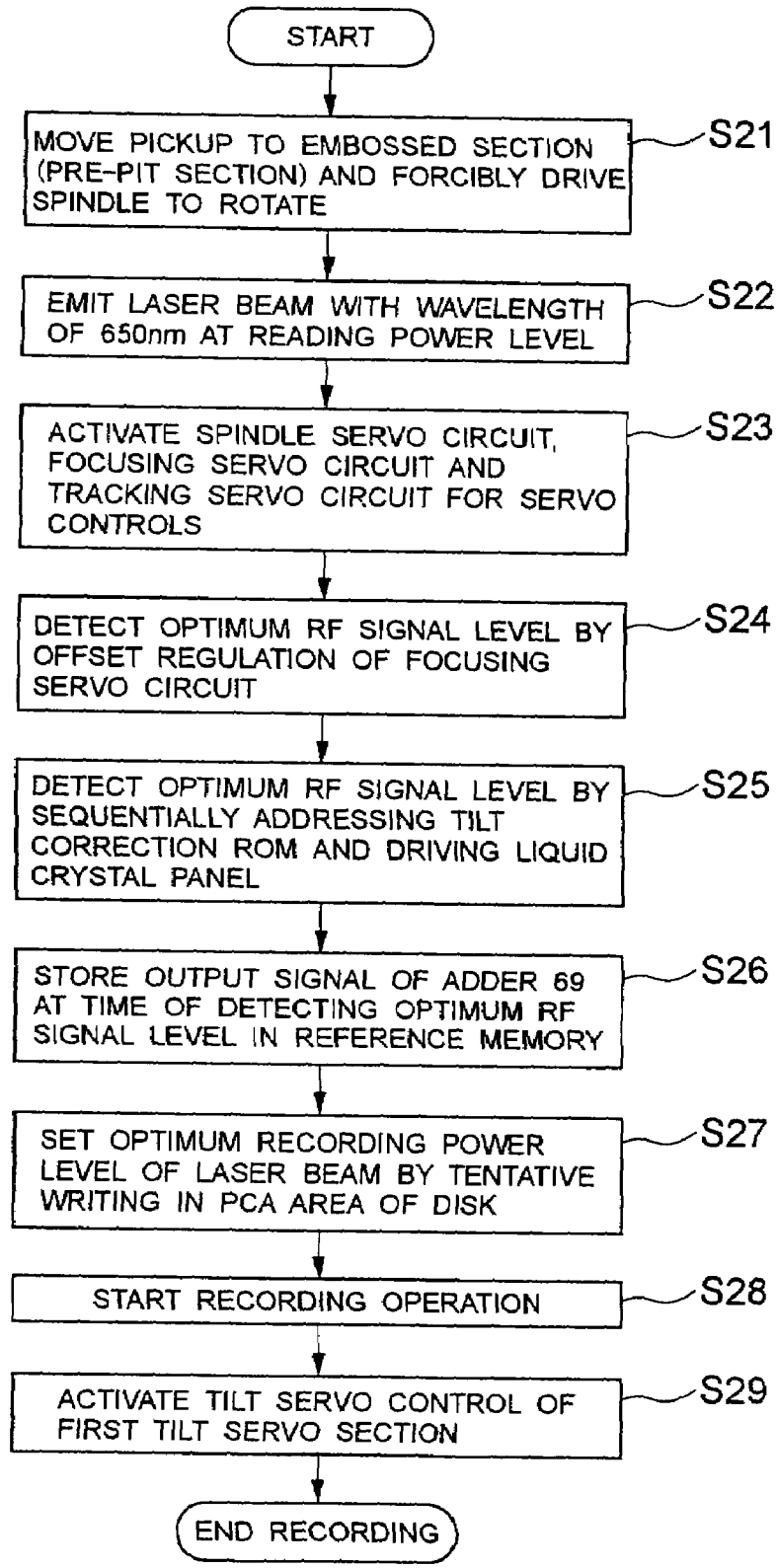
FIG. 20 is a flow chart of the tilt servo control operation of a first tilt servo section for a general purpose DVD-R or a DVD-RW.
Figure 21:
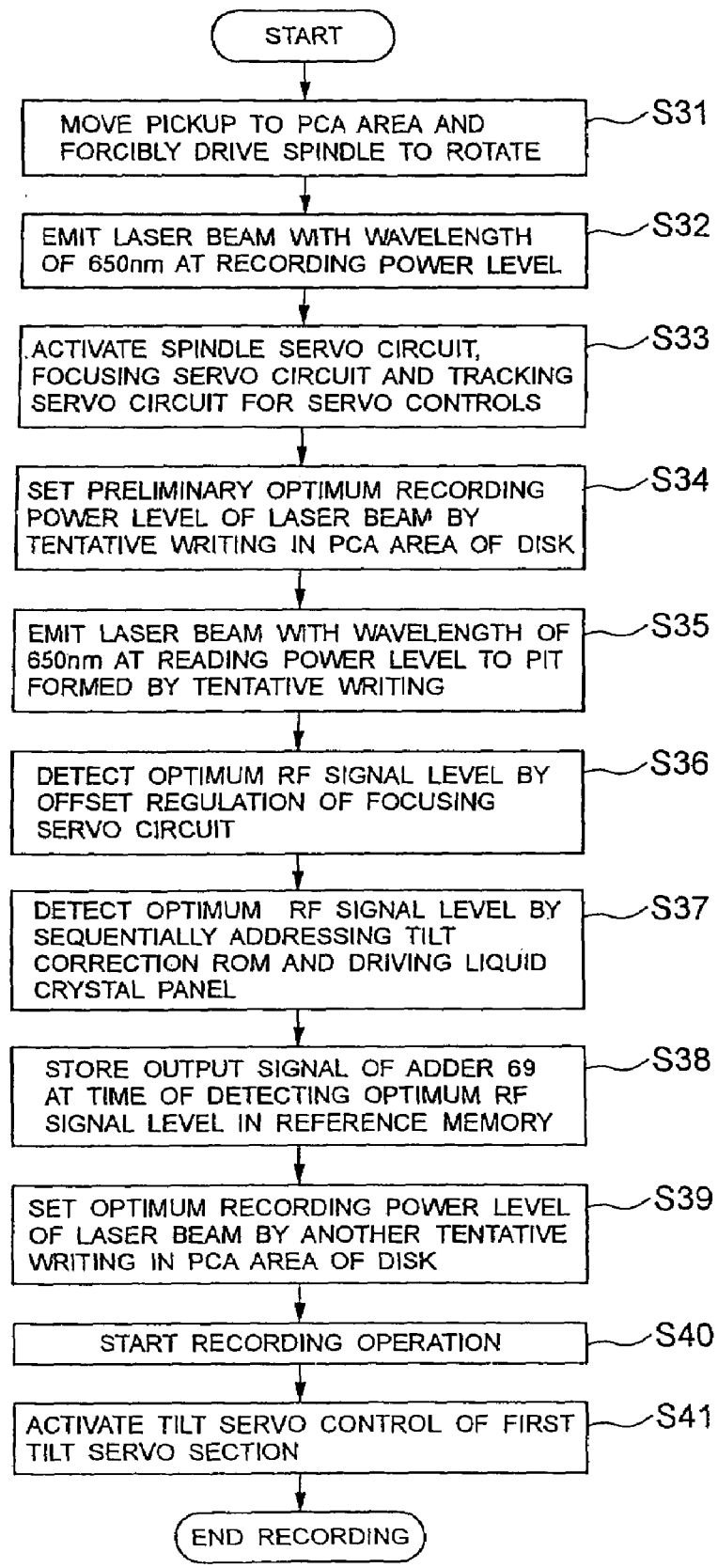
FIG. 21 is a flow chart of a tilt servo control operation of the first tilt servo section for an authoring purpose DVD-R.

Firstly, referring to FIG. 17, the disk discriminating circuit 52 determines if a recording command is issued from the system control circuit 1 or not (Step S1). If it is determined that a recording command is issued, it determines if the disk 12 is of the CD type or of the DVD type (Step S2). A CD type disk may be a CD, a CD-ROM or a CD-R. A DVD type disk may be a DVD, a DVD-ROM, a DVD-R, a DVD-RAM or a DVD-RW. For the operation of Step S2, a laser beam having a wavelength of 780 nm is emitted from the semiconductor laser element 22 for CDs at a reading power level and the disk 12 is driven to rotate as the switch 92 is turned on. Then, a variable voltage is supplied from the voltage application circuit 67 to the drive circuit 68 by way of the adder 66 to forcibly drive the focus actuator section and continuously move the focused position on the disk 12. As the focused position is moved, the S-characteristic of the focus error signal FE is observed. As shown in FIG. 19, the S-characteristic appears when the focused position is located on the disk surface and when it is located on the pit producing surface. The time interval from the appearance of S due to the disk surface and the one due to the pit producing surface is observed. As seen from FIG. 19, the time interval A from the appearance of S due to the disk surface and the one due to the pit producing surface of a DVD type disk is shorter than the corresponding time interval B of a CD type disk. Therefore, if the observed time interval is greater than a predetermined time threshold value, the disk is determined to be a CD type disk. On the other hand, if the observed time interval is smaller than the predetermined time threshold value, the disk is determined to be DVD type disk.

If it is determined in Step S2 that the disk is of the DVD type, the disk discriminating circuit 52 further determines if the disk 12 belongs to the first category covering single-layered DVD-ROMs and DVD-Rs or the second category covering double-layered DVD-ROMs, DVD-RAMs and DVD-RWs (Step S3). In the operation of Step S3, a laser beam having a wavelength of 650 nm is emitted from the semiconductor laser element 21 for DVDs at the reading power level and the disk 12 is driven to rotate as the switch 92 is turned on. Then, a variable voltage is supplied from the voltage application circuit 67 to the drive circuit 68 by way of the adder 66 to forcibly drive the focus actuator section and continuously move the focused position on the disk 12. As the focused position is moved, the S-characteristic of the focus error signal FE corresponding the pit producing surface is observed. The amplitude of the S formed by the pit producing surface of a single-layered DVD-ROM or a DVD-R is greater than its counterpart of a double-layered DVD-ROM, a DVD-RAM or a DVD-RW. Generally, DVD-RAMs and DVD-RWs, that are rewritable disks, are made of a phase change material and hence show a low reflectance. Double layered DVD-ROMs are made semitransparent in the pit producing surface and hence show a low reflectance. A disk showing a low reflectance also shows an S having a small amplitude. Thus, the disk 12 is determined to be either a single-layered DVD-ROM or a DVD-R of the first category when the amplitude of the S is smaller than a predetermined threshold value, whereas it is determined to be a double-layered DVD-ROM, a DVD-RAM or a DVD-RW of the second category.

If, in Step S3, it is determined that the disk belongs to the first category and hence is either a single-layered DVD-ROM or a DVD-R, it is then determined if the disk 12 is a single-layered DVD-ROM or a DVD-R (Step S4). In the disk discriminating operation of Step S4, a laser beam having a wavelength of 650 nm is emitted from the semiconductor laser element 21 for DVDs at the reading power level and the disk 12 is driven to rotate as the switch 92 is turned on as in Step S3. However, the supply of the variable voltage from the voltage application circuit 67 is suspended. Then, the switch 65 is turned on and the focusing servo circuit 53 performs a focusing operation. Additionally, the switch 47 is turned on and the tracking servo circuit 54 performs a tracking operation. Under this condition, it is determined if the RF signal or the tracking error signal being read contains a groove wobble signal component or not. If a groove wobble signal component is detected, the disk is determined to be a DVD-R. If, on the other hand, no groove wobble signal component is detected, the disk is determined to be a single-layered DVD-ROM.

As shown in FIG. 4, in case of DVD-R and DVD-RW groove wobbles 103 are formed on the pit producing surface and LPPs (land pre-pits) 104 are formed between adjacent groove wobbles 103. The LPPs 104 are used for accurately determining the recording position on the basis of a unit of bit and obtaining various pieces of information on the disk including pre-addresses.

If, on the other hand, it is determined in Step S4 that the disk 12 is a DVD-R, it is then determined if the DVD-R is a general purpose DVD-R or an authoring purpose DVD-R (Step S5). More specifically, the information of the LPPs is read out to see if the DVD-R is a general purpose DVD-R or an authoring DVD-R after the determination of the category of the disk in Step S4.

If, in Step S5, it is determined that the disk 12 is an authoring purpose DVD-R, the system control circuit 1 controls the recording operation for the authoring purpose DVD-R. If, on the other hand, it is determined in Step S5 that the disk 12 is a general DVD-R, the system control circuit 1 controls the recording operation for the general purpose DVD-R and DVD-RW. The first tilt servo section for DVD-Rs and DVD-RWs is used for controlling the recording operation for an authoring purpose DVD-R, a general purpose DVD-R or a DVD-RW. More specifically, the selector 88 relays the output values of the tilt correction ROM 75 to the registers 96a through 96c in accordance with the command from the system control circuit 1, respectively.

If it is determined in Step S4 that the disk 12 is a single-layered DVD-ROM, an impossible recording message is displayed on a display (not shown) (Step S6).

If it is determined in Step S3 that the disk 12 belongs to the second category and may be a double-layered DVD-ROM, a DVD-RAM or a DVD-RW, it is then determined if the disk 12 is a double-layered DVD-ROM or not and hence a DVD-RW or a DVD-RAM (Step S7). In Step S7, a laser beam having a wavelength of 650 nm is emitted from the semiconductor laser element 21 for DVDs at the reading power level and the disk 12 is driven to rotate as the switch 92 is turned on as in Step S3. However, the supply of the variable voltage from the voltage application circuit 67 is suspended. Then, the switch 65 is turned on and the focusing servo circuit 53 performs a focusing operation. Additionally, the switch 47 is turned on and the tracking servo circuit 54 performs a tracking operation. Under this condition, it is determined if the RF signal or the tracking error signal being read contains a groove wobble signal component or not. If a groove wobble signal component is detected, the disk is determined to be a DVD-RW or a DVD-RAM. If, on the other hand, no groove wobble signal component is detected, the disk is determined to be a double-layered DVD-ROM.

If it is determined in Step S7 that the disk 12 is a double-layered DVD-ROM, the processing operation proceeds to Step S6 and an impossible recording message is displayed on a display screen (not shown).

If it is determined in Step S7 that the disk 12 is either a DVD-RW or a DVD-RAM, then it is determined if the disk 12 is in fact a DVD-RW or a DVD-RAM (Step S8). The operation of driving the disk player in Step S6 is continued to Step S8. Thus, it is determined if the push-pull signal such as a tracking error signal TE contains an LPP signal component corresponding to an LPP or not. If an LPP signal component is detected in the push-pull signal, the disk 12 is determined to be a DVD-RW. If, on the other hand, no LPP signal component is detected, the disk 12 is determined to be a DVD-RAM.

If, in Step S8, it is determined that the disk 12 is a DVD-RW, the system control circuit 1 controls the recording operation for a general purpose DVD-R or a DVD-RW. If, on the other hand, it is determined in Step S8 that the disk is a DVD-RAM, the system control circuit 1 controls the recording operation for the general purpose DVD-RAM. The second tilt servo section for DVD-RAMs is used for controlling the recording operation for a DVD-RAM. More specifically, the selector 88 relays the output values of the tilt correction ROM 80 to the registers 96a through 96c in response to the command from the system control circuit 1, respectively.

If it is determined in Step S2 that the disk is of the CD type, it is further determined if the disk 12 is a CD-ROM or a CD-R (Step S9). In the determination of Step S9, a laser beam having a wavelength of 780 nm is emitted from the semiconductor laser element 22 for CDs at the reading power level and the disk 12 is driven to rotate as the switch 92 is turned on as in Step S2. However, the supply of the variable voltage from the voltage application circuit 67 is suspended. Then, the switch 65 is turned on and the focusing servo circuit 53 performs a focusing operation. Additionally, the switch 47 is turned on and the tracking servo circuit 54 performs a tracking operation. Under this condition, it is determined if the RF signal or the tracking error signal TE being read contains a groove wobble signal component or not. If a groove wobble signal component is detected, the disk is determined to be a CD-R. If, on the other hand, no groove wobble signal component is detected, the disk is determined to be a CD-ROM.

If it is determined in Step S9 that the disk 12 is a CD-ROM, the processing operation proceeds to Step S10 and an impossible recording message is displayed on a display screen (not shown) as in Step S6.

If, on the other hand, it is determined in Step S9 that the disk is a CD-R, the system control circuit 1 controls the signal recording operation for the CD-R. In the recording operation for the CD-R, no tilt servo control is performed.

If it is determined in Step S1 that no recording command is issued, it is then determined if a playback command is issued from the system control circuit 1 or not (Step S11). If it is determined that the playback command is issued, it is then determined if the disk 12 is of the CD type or of the DVD type (Step S12). The processing operation of Step S12 is similar to that of Step S2.

If it is determine in Step S12 that the disk 12 is of the CD type, the system control circuit 1 controls playback operation for the CD type disk. No tilt servo control operation is performed in the playback operation for the CD type disk.

If, on the other hand, it is determined in Step S12 that the disk is of the DVD type, it is then determined if the disk 12 is a DVD-RAM or not (Step S13). In the operation of Step S13, a laser beam having a wavelength of 650 nm is emitted from the semiconductor laser element 21 for DVDs at the reading power level and the disk 12 is driven to rotate as the switch 92 is turned on. Then, a variable voltage is supplied from the voltage application circuit 67 to the drive circuit 68 by way of the adder 66 to forcibly drive the focus actuator section and continuously move the focused position on the disk 12. As the focused position is moved, the S-characteristic of the focus error signal FE that corresponds to the bit producing surface is observed. After the suspension of the supply of the variable voltage from the voltage application circuit 67, the switch 65 is turned on and the focusing servo circuit 53 performs a focusing operation. Additionally, the switch 47 is turned on and the tracking servo circuit 54 performs a tracking operation. Under this condition, it is determined if the push-pull signal such as tracking error signal TE contains an LPP signal component corresponding to an LPP or not. If the amplitude of the S is less than a threshold value and the push-pull signal does not contain any LPP signal component, the disk is determined to be a DVD-RAM.

If it is determined in Step S13 that the disk 12 is a DVD-RAM, the system control circuit 1 controls playback operation for the DVD-RAM. If, on the other hand, it is determined in Step S13 that the disk 12 is a DVD type disk other than a DVD-RAM, the system control circuit 1 controls playback operation for the DVD-ROM. In the playback operation for the DVD-ROM, a tilt servo section for DVD-ROMs is used. In other words, the selector 88 relays the output values of the tilt correction ROM 87 to the registers 96a through 96c in response to the command from the system control circuit 1, respectively.

For the purpose of the invention, the above described disk discriminating method may be replaced by some other disk discriminating method such as one for detecting the contents of the TOC of the optical disk.

Now, the control operation of the first tilt servo section when the disk 12 is a DVD-R or a DVD-RW will be discussed below.

Firstly, for controlling the operation of recording a signal on a general purpose DVD-R or a DVD-RW, the system control circuit 1 forcibly drives the slider 100 by means of the drive circuit 8 to move the pickup 10 onto the embossed section (pre-write) section of the disk 12 and forcibly rotate the disk (Step S21). The forced rotation is typically realized by feeding a spindle drive signal SPD for predetermined rotational speed to the drive circuit 83 from an appropriate circuit (not shown). Additionally, the system control circuit 1 causes the drive circuit 18 to drive the semiconductor laser element 21 for DVDs and make the latter emit a laser beam having a wavelength of 650 nm at the reading power level (Step S22) and turns on the switch 92 to drive the disk 12 to rotate under the control of the spindle servo circuit 93 for spindle rotation. Furthermore, the system control circuit 1 turns on the switch 65 to make the focusing servo circuit 53 operate for focusing and also the switch 47 to make the tracking servo circuit 54 operate for tracking (Step S23). Alternatively, it may be so arranged that a variable bias voltage is multiplexed with the tracking error signal to detect the bias voltage that maximizes the RF signal level.

Then, the focusing servo circuit 53 detects an optimal level of the RF signal by means of offset regulation (Step S24). In other words, the focusing servo circuit 53 multiplexes the focus error signal with the bias voltage from a bias circuit (not shown) and the bias voltage is made to vary to find out the bias voltage level that maximizes the RF signal level. Thereafter, the regions 13a through 13c of the liquid crystal panel 13 are driven by the tilt servo system to detect the optimum RF signal level (Step S25). More specifically, the correction values of the regions 13a through 13c that correspond to the respective addresses of the tilt correction ROM 75 are read out and sequentially fed to the respective registers 96a through 96c by way of the selector 88. Then, the PWM sections 97a through 97c are drive to generate tilt drive signals TID in order to drive the respective regions 13a through 13c of the liquid crystal panel 13 by way of the drive circuit 28 so that the address value or the three correction values that maximize the RF signal level may be detected.

When the optimum RF signal level is detected, the level of the output signal of the adder 69 is stored in the reference memory 71 as reference signal (Step S26). The changeover switch 70 relays the output signal of the adder 69 to the reference memory 71 while the processing operation of Step S26 is being carrier out but, when the operation of Step S26 is over, it is switched to relay the output signal of the adder 69, which is a push-pull offset signal, to the subtracter 72 through the low pass filter 73. Then, it performs a tentative writing operation in the PCA area of the disk to determine an optimal recording power level of the laser beam (Step S27). Thereafter, it starts a recording operation (Step S28) and drives the regions 13a through 13c of the liquid crystal panel 13 according to the tilt signal computationally determined by the first tilt servo section for DVD-Rs and DVD-RWs (Step S29). More specifically, level difference signal representing the level difference between the output signal of the adder 69 through the low pass filter 73 and the reference signal stored in the reference memory 71 is produced from the subtracter 72 and supplied to the A/D converter 74 as tilt error signal. The output signal of the A/D converter 74 represents addresses in the tilt correction ROM 75 and three correction values corresponding to the addresses are read out of the tilt correction ROM 75. The three correction values are then fed to the respective registers 96a through 96c by way of the selector 88 so that the PWM sections 97a through 97c generate corresponding tilt drive signals TID, which are then used by the drive circuit 28 to drive the respective regions 13a through 13c of the liquid crystal panel 13. The processing operation of Step S29 continues until the recording operation ends.

For controlling the recording operation on the authoring purpose DVD-R, the system control circuit 1 forcibly drives the slider 100 by means of the drive circuit 8 so as to move the pickup 10 to the PCA area of the disk 12 and forcibly rotate the disk 12 (Step S31). Then, it issues a command for driving the semiconductor laser element 21 for DVDs to emit a laser beam having a wavelength of 650 nm at the recording power level (Step S32). The system control circuit 1 then turns on the switch 92 to drive the disk 12 to rotate under the control of the spindle servo circuit 93 for spindle rotation. Furthermore, the system control circuit 1 turns on the switch 65 to make the focusing servo circuit 53 operate for focusing and also the switch 47 to make the tracking servo circuit 54 operate for tracking (Step S33). Then, it performs a tentative writing operation in the PCA area of the disk to determine an optimal recording power level of the laser beam (Step S34). Subsequently, it changes the recording power level stepwise to preliminarily determine an optimum recording power level.

After carrying out Step S34, the system control circuit 1 issues a command for driving the semiconductor laser element 21 for DVDs to emit a laser beam having a wavelength of 650 nm at the reading power level to the tentatively written pit (Step 35) and causes the focusing servo circuit 53 to detect an optimum RF signal level by means of offset regulation (Step S36). More specifically, the focusing servo circuit 53 multiplexes the focus error signal with the bias voltage from a bias circuit (not shown) and the bias voltage is made to vary to find out the bias voltage level that maximizes the RE signal level. It may be so arranged that the tracking servo circuit 54 also detects an optimum RF signal level also by means of offset regulation at the same time. Thereafter, the regions 13a through 13c of the liquid crystal panel 13 are driven by the tilt servo system to detect the optimum RF signal level (Step S37). More specifically, the correction values of the regions 13a through 13c that correspond to the respective addresses of the tilt correction ROM 75 are read out and sequentially fed to the respective registers 96a through 96c by way of the selector 88. Then, the PWM sections 97a through 97c are driven to generate tilt drive signals TID in order to drive the respective regions 13a through 13c of the liquid crystal panel 13 by way of the drive circuit 28 so that the address value or the three correction values that maximize the RF signal level may be detected.

When the optimum RF signal level is detected, the level of the output signal of the adder 69 is stored in the reference memory 71 as reference signal (Step S38). The changeover switch 70 relays the output signal of the adder 69 to the reference memory 71 while the processing operation of Step S38 is being carrier out but, when the operation of Step S38 is over, it is switched to relay the output signal of the adder 69, which is a push-pull offset signal, to the subtracter 72. Then, it performs a tentative writing operation in the PCA area of the disk to determine an optimal recording power level of the laser beam (Step S39). Thereafter, it starts a recording operation (Step S40) and drives the regions 13a through 13c of the liquid crystal panel 13 according to the tilt error signal computationally determined by the first tilt servo section for DVD-Rs and DVD-RWs (Step S41). The processing operation of Step S41 continues until the recording operation ends.

Figure 22:
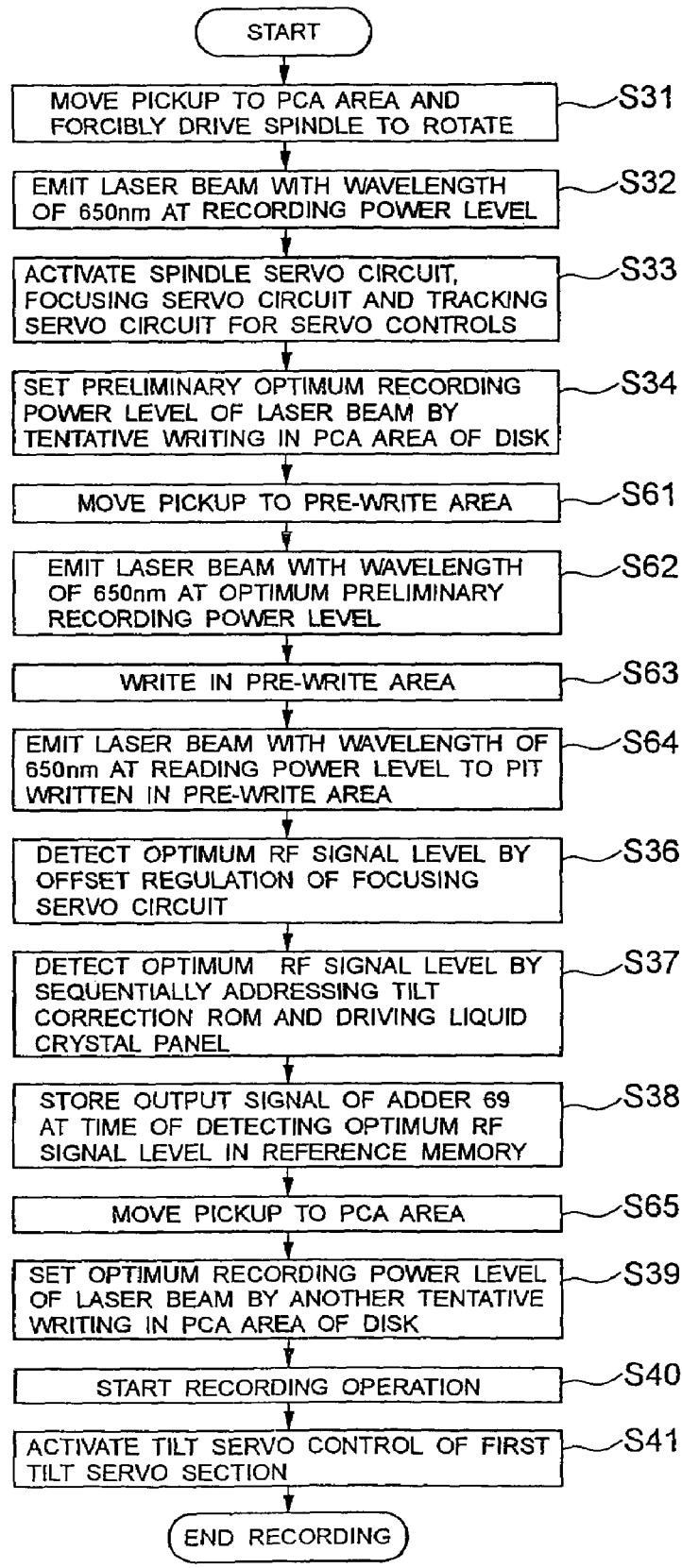
FIG. 22 is a flow chart of an alternative tilt servo control operation of the first tilt servo section for an authoring purpose DVD-R.

The user can pre-write management information or the like on an authoring purpose DVD-R. FIG. 22 is a flow chart of a tilt servo control operation of the first tilt servo section that can be used for an authoring purpose DVD-R when the use of the pre-write feature is involved. Referring to FIG. 22, after carrying out Steps S31 through S34, the system control circuit 1 forcibly drives the slider 100 by means of the drive circuit 8 to move the pickup 10 onto the pre-write section for a pre-write operation (which corresponds to the pre-write section of a general purpose DVD) of the disk 12 (Step S61) and issues a command for driving the semiconductor laser element 21 for DVDs to emit a laser beam having a wavelength of 650 nm at a preliminarily determined optimum recording power level (Step S62) and write a signal in the pre-write section of the disk with the preliminarily determined optimum recording power level (Step S63). After Step S63, the system control circuit 1 issues a command for driving the semiconductor laser element 21 for DVDs to emit a laser beam having a 650 nm at the reading power level (Step S64) and then proceeds to Step S36, where it causes the focusing servo circuit 53 to detects an optimum RF signal level by means of offset regulation. Thereafter, the system control circuit 1 performs Steps S37 through S41. Note that the system control circuit 1 forcibly drives the slider 100 by means of the drive circuit 8 to move the pickup 10 onto the PCA area of the disk 12 before executing Step S39 (Step S65).

While a tilt servo control device including a liquid crystal panel 13 is used as tilt angle adjusting means for compensating the tilt angle in the above embodiment, an actuator for mechanically regulating the inclination of the pickup or the objective lens relative to the optical disk may be used to replace the tilt servo control device. Then, the actuator will be driven in accordance with a tilt error signal.

As described above in detail, according to the invention, there are provided a tilt servo control device and a tilt servo control method that can be used with mint optical recording media bearing no written information for the purpose of tilt servo control operations.

The present invention can be applied to not only an optical disk player with a recording function but also an optical disk player without a recording function.

According to the invention, since the type of an optical recording medium set in the recording/reproducing apparatus is determined and a method for generating a tilt drive signal corresponding to the determination is selected, the tilt servo can be properly controlled for optical recording media of various different types.

This application is based on Japanese Patent Application No. 2000-367305 which is hereby incorporated by reference.

What is claimed is:

1. A tilt servo control device of an information recording/reproducing apparatus for recording information on and reproducing information from an optical recording medium set into said apparatus, said apparatus comprising an optical system for leading a laser beam emitted from a light source to a recording surface of the optical recording medium and a laser beam reflected by the recording surface of the recording medium to a photo detector and a read signal generator for generating a read signal in accordance with an output signal of the photo detector, said photo detector having a main light receiving section which is divided into at least two portions and two sub light receiving sections between which said main light receiving section is inserted, which are respectively divided into two portions, and each of said main light receiving section and said sub light receiving sections being arranged so that the divided line thereof is parallel with a tangential direction of a track of said optical recording medium, and generating an output signal for each divided portion, said device comprising:

a recording medium type determining device which determines a type of said optical recording medium;

a tilt drive signal generator which generates a tilt drive signal so as to reduce a tilt angle between a normal to the recording surface of said optical recording medium at a position of the laser beam irradiating said recording surface and an optical axis of said laser beam by a method for generating a tilt drive signal corresponding to the type determined by said recording medium type determining device;

a tilt angle adjuster which adjusts said tilt angle; and a driver which drives said tilt angle adjuster in accordance with said tilt drive signal, wherein said apparatus comprising;

a main push-pull signal generator which generates a main push-pull signal representing the differential component of the output signals of said main light receiving section;

a sub push-pull generator which generates first and second sub push-pull signals representing the differential components of the output signals of said two sub light receiving sections; and a first adder which adds said first and second sub push-pull signals and multiplying the sum of the addition by a predetermined coefficient to generate a sub push-pull sum signal, and wherein said tilt drive signal generator includes:

a first tilt servo section having a second adder which adds the main push-pull signal and the sub push-pull sum signal to generate an output signal including only a direct current (DC) component, a low pass filter which smoothes the output signal of said second adder to remove an eccentric component of the recording medium, a first tilt error signal generator which stores an output signal of said low pass filter as a reference signal before an information recording operation onto the recording medium and subtracts the reference signal from the output signal of said low pass filter during the recording operation to generate a first tilt error signal representing the tilt angle, and a generator which generates a signal representing a correction value for each of said plurality of regions in response to said first tilt error signal;

a second tilt servo section having a delay element which delays said read signal by a predetermined time period, a second tilt error signal generator which generates a second tilt signal by subtracting said read signal from an output signal of said delay element and a generator which generates a signal representing the correction value for each of said plurality of regions in response to said second tilt error signal;

a third tilt servo section which generates a signal representing the correction value for each of said plurality of regions so as to maximize the level of the read signal;

a selector which selects one tilt servo section of said first, second and third tilt servo sections in accordance with the type of the recording medium determined by said recording medium type determining device; and a generator which generates said tilt drive signal in accordance with the correction value output from the one tilt servo section selected by said selector.

2. A title servo control device according to claim 1, wherein said selector selects said first tilt servo section when said recording medium type determining device determines that said optical recording medium set into said apparatus at the time of recording information is a DVD-RW or a general purpose DVD-R, and selects said second tilt servo section when said recording medium type determining device determines that said optical recording medium set into said apparatus at the time of recording information is a DVD-RAM.

3. A tilt servo control device according to claim 1, wherein said selector selects said second tilt servo section when said recording medium type determining device determines that said optical recording medium set into said apparatus at the time of reproducing information is a DVD-RAM, and selects said third tilt servo section when said recording medium type determining device determines that said optical recording medium set into said apparatus at the time of reproducing information is a DVD type disk other than a DVD-RAM.

4. A tilt servo control device according to claim 1, wherein the tilt adjusting operation of said tilt angle adjuster is stopped when said recording medium type determining device determines that said optical recording medium set into said apparatus at the time of recording or reproducing information is a CD type disk.

5. A tilt servo control device according to claim 1, wherein said predetermined time period corresponds to time taken when the irradiating position of the laser beam moves a first header field and a second header field of a header section of a DVD-RAM.

* * * * *

UNITED STATES PATENT AND TRADEMARK OFFICE
CERTIFICATE OF CORRECTION

PATENT NO. : 7,154,831 B2  Page 1 of 1
APPLICATION NO. : 11/174478
DATED : December 26, 2006
INVENTOR(S) : Naoharu Yanagawa et al.

It is certified that error appears in the above-identified patent and that said Letters Patent is hereby corrected as shown below:

Claim 1, column 18, line 20, insert --error-- following "tilt"

Signed and Sealed this

Thirteenth Day of November, 2007

JON W. DUDAS
*Director of the United States Patent and Trademark Office*